US010701014B2

(12) United States Patent
Perazzo et al.

(10) Patent No.: US 10,701,014 B2
(45) Date of Patent: Jun. 30, 2020

(54) CONTEXTUAL MESSAGING SYSTEMS AND METHODS

(71) Applicants: Paolo Perazzo, San Francisco, CA (US); Navin Goel, San Francisco, CA (US); Brett Galloway, Los Altos, CA (US)

(72) Inventors: Paolo Perazzo, San Francisco, CA (US); Navin Goel, San Francisco, CA (US); Brett Galloway, Los Altos, CA (US)

(73) Assignee: Companyons, Inc., San Francisco, CA (US)

( * ) Notice: Subject to any disclaimer, the term of this patent is extended or adjusted under 35 U.S.C. 154(b) by 712 days.

(21) Appl. No.: 14/979,839

(22) Filed: Dec. 28, 2015

(65) Prior Publication Data

US 2016/0112362 A1   Apr. 21, 2016

Related U.S. Application Data

(63) Continuation-in-part of application No. 13/835,889, filed on Mar. 15, 2013.

(51) Int. Cl.
*H04L 12/58* (2006.01)
*G06Q 10/10* (2012.01)
(Continued)

(52) U.S. Cl.
CPC ...... *H04L 51/18* (2013.01); *G06Q 10/063114* (2013.01); *G06Q 10/109* (2013.01);
(Continued)

(58) Field of Classification Search
CPC .................. G06Q 10/109–1097; H04L 51/18
See application file for complete search history.

(56) References Cited

U.S. PATENT DOCUMENTS 6,457,045 B1 * 9/2002 Hanson ................ G06Q 10/107
707/999.01
7,451,186 B2 * 11/2008 Morinigo ............. G06Q 10/107
709/206
(Continued)

OTHER PUBLICATIONS

Hohpe, G., Woolf, B. Enterprise Integration Patterns, Oct. 2003, <www.enterpriseintegrationpatterns.com>. Web Archive, Apr. 28, 2015, <web.archive.org/web/20150831065542/http://www.enterpriseintegrationpatterns.com:80/> (Year: 2015).*

(Continued)

*Primary Examiner* — Christine M Behncke
*Assistant Examiner* — Abhijit B Sadananda
(74) *Attorney, Agent, or Firm* — Clements Bernard Walker; Lawrence A. Baratta, Jr.

(57) ABSTRACT

Contextual messaging systems and message implemented through a mobile device associated with a sender of a message include composing a message to a recipient via a messaging application; selecting one or more unique characters or pictures to trigger one or more of functionality, an application, or a service on a mobile device associated with the recipient; selecting one or more additional details subsequent to selecting the one or more unique characters or pictures, wherein the one or more additional details are used in the functionality, application or service; and sending the message to a mobile device associated with the recipient with the one or more unique characters or pictures and the one or more additional details. The mobile device is configured to receive the message and automatically perform one or more actions based on the one or more unique characters or pictures and the one or more additional details.

13 Claims, 14 Drawing Sheets

(51) Int. Cl.
    *G06F 3/0481*     (2013.01)
    *G06Q 10/06*     (2012.01)

(52) U.S. Cl.
    CPC ........ *H04L 51/046* (2013.01); *G06F 3/04817* (2013.01); *G06Q 10/107* (2013.01)

(56) References Cited

U.S. PATENT DOCUMENTS

| | | | |
|---|---|---|---|
| 7,590,971 B2 | 9/2009 | Ferguson et al. | |
| 2002/0007300 A1 | 1/2002 | Slatter | |
| 2002/0099777 A1* | 7/2002 | Gupta | G06F 17/241 709/206 |
| 2003/0126207 A1* | 7/2003 | Creamer | H04M 3/56 709/204 |
| 2004/0141004 A1* | 7/2004 | Cabezas | G06Q 10/107 715/751 |
| 2004/0215479 A1* | 10/2004 | Dorsey | G06Q 10/107 709/206 |
| 2005/0120306 A1* | 6/2005 | Klassen | G06F 3/0482 715/765 |
| 2005/0195428 A1 | 9/2005 | Archbold | |
| 2005/0198085 A1 | 9/2005 | Blakey et al. | |
| 2006/0223509 A1 | 10/2006 | Fukazawa et al. | |
| 2007/0276715 A1 | 11/2007 | Beringer et al. | |
| 2009/0061833 A1* | 3/2009 | Ho | H04M 1/72552 455/414.2 |
| 2009/0204471 A1 | 8/2009 | Elenbaas et al. | |
| 2009/0248480 A1 | 10/2009 | Miksovsky | |
| 2009/0248806 A1* | 10/2009 | Tetuan | G06Q 30/02 709/206 |
| 2010/0273450 A1* | 10/2010 | Papineau | G06F 8/60 455/411 |
| 2010/0287241 A1* | 11/2010 | Swanburg | H04L 51/28 709/206 |
| 2011/0112943 A1 | 5/2011 | Dietz et al. | |
| 2011/0125545 A1* | 5/2011 | Lehmann | G06Q 10/06314 705/7.24 |
| 2012/0030194 A1* | 2/2012 | Jain | G06F 3/0481 707/722 |
| 2012/0042025 A1* | 2/2012 | Jamison | G06Q 10/107 709/206 |
| 2012/0322470 A1* | 12/2012 | Said | G06Q 10/107 455/466 |
| 2013/0007648 A1* | 1/2013 | Gamon | G06Q 10/109 715/771 |
| 2013/0174002 A1* | 7/2013 | Jones | G06F 17/30882 715/208 |
| 2014/0173460 A1* | 6/2014 | Kim | H04L 51/18 715/753 |
| 2014/0288990 A1* | 9/2014 | Moore | G06Q 10/1095 705/7.19 |
| 2014/0337751 A1* | 11/2014 | Lim | G06F 17/2765 715/744 |
| 2015/0100647 A1* | 4/2015 | Agustin | H04L 51/10 709/206 |
| 2015/0143258 A1* | 5/2015 | Carolan | G06F 3/0484 715/752 |
| 2015/0196838 A1* | 7/2015 | Gough | H04L 51/18 463/14 |
| 2015/0312180 A1* | 10/2015 | Taler | H04L 51/046 715/752 |
| 2015/0319120 A1* | 11/2015 | Hull | H04L 51/18 709/206 |
| 2015/0324858 A1* | 11/2015 | DeMattei | H04L 51/08 705/14.64 |
| 2016/0042324 A1* | 2/2016 | Johnson | G06Q 10/1095 705/7.19 |
| 2016/0117670 A1* | 4/2016 | Davis | G06Q 20/40 705/39 |
| 2016/0344677 A1* | 11/2016 | MacDonald | H04L 51/08 |
| 2016/0366079 A1* | 12/2016 | Razavian | G06Q 10/1095 |

OTHER PUBLICATIONS

Gonzalez, N. "Automatically Create Calendar Events from Incoming Text Messages on Android." Gadget Hacks Shop, Jan. 14, 2015, <gs4.gadgethacks.com/how-to/autornatically-create-calendar-events-from-incoming-text-messages-android-0159014/>. (Year : 2015).*

* cited by examiner

CONTEXTUAL MESSAGING SYSTEMS AND METHODS

CROSS-REFERENCE TO RELATED APPLICATION(S)

The present patent/application is a continuation-in-part of U.S. application Ser. No. 13/835,889, filed Mar. 15, 2013, and entitled "BUSINESS WORKFLOW MANAGEMENT SYSTEMS AND METHODS," the contents of which are incorporated by reference.

FIELD OF THE DISCLOSURE

The present disclosure generally relates to contextual messaging systems and methods. More particularly, the present disclosure relates to contextual messaging systems and methods implemented in a messaging platform that is configured to trigger functionalities, applications, and services based on message content.

BACKGROUND OF THE DISCLOSURE

Mobile devices, such as smartphones, tablets, "phablets," and the like, are always-on and typically always carried by users. That is, mobile devices are the first contextual device always with us. A key aspect of mobile devices is messaging, such as text messaging, email, instant messaging, etc. Various mobile device platforms have various messaging applications and platforms, such as Apple's iMessage, SnapChat, WhatsApp, Facebook Messenger, Blackberry Messenger, etc. While conventional messaging applications and platforms have developed rich features including file sharing (pictures, video, etc.), real-time audio/video, emoji, and the like, conventional messaging applications and platforms do not yet work seamlessly with other mobile applications, such as maps, calendars, to-do lists, etc. Specifically, information contained in messages can be scanned, and the mobile device can make a judgment that a particular piece of information is a date/time for a calendar, a phone number, etc. However, this is not integration. At best, this approach creates a hyperlink for a subsequent action by the receiving user. For example, touching or clicking on a phone number causes a phone app to dial the number, touching or clicking an address causes a map app to bring up the location, etc. Conventional approaches require manual effort by the user to take information from messages and perform actions in other applications on the mobile device.

Additionally, a variety of tools exist for assisting businesses to operate, such as, without limitation, accounting packages, enterprise resource planning (ERP) systems, workflow management systems, customer relationship management (CRM) systems, timekeeping systems, and the like. These tools can be collectively referred to as software packages that assist businesses, their owners, employees, etc. in day-to-day operations as well as strategic operations. Businesses can generally be classified by size, i.e. small to medium-sized businesses and large businesses. In the context of large businesses, these organizations generally have rich Information Technology (IT) infrastructures along with customization of the aforementioned software tools to their specific needs. Furthermore, large businesses include infrastructure and employees dedicated to operating various corporate functions (e.g., accounts receivable, accounts payable, human resources, etc.). These various corporate functions can be generally referred to as the administrative tasks associated with running a business. In the context of large businesses, employees and business owners are only required to focus on a small subset of the administrative tasks of the business.

Small and medium-sized business owners and employees are typically good at their associated core business, but not so much with respect to the administrative tasks. This is as expected—small businesses are successful because of their core business focus, not because they operate with optimal efficiency from a financial, manufacturing, etc. perspective. Disadvantageously, small and medium-sized businesses do not have the scale for a rich IT infrastructure, customization of software tools or use of the software tools, or dedicated resources to perform the administrative tasks. A further observation is that most "off-the-shelf" tools for small and medium-sized businesses are directed to the accountants or bookkeepers for the business, not the business owners or employees. Furthermore, these "off-the-shelf" tools are typically primarily used by the accountants or bookkeepers as a compliance tool for preparing tax filings and the like. Having small and medium-sized business owners and employees become experts in such tools is not an optimal solution as it inevitably takes them away from the core business focus. However, the important data is there in such tools and is not presently being provided to the small and medium-sized business owners and employees in a manner that enables them to optimize business operation and overall productivity.

Thus, there exists a need for contextual messaging which integrates messaging into other applications and platforms on a mobile device along with contextual task/to-do management using the mobile device.

BRIEF SUMMARY OF THE DISCLOSURE

In an exemplary embodiment, a contextual messaging method implemented through a mobile device associated with a sender of a message includes composing a message to a recipient via a messaging application; selecting one or more unique characters or pictures to trigger one or more of functionality, an application, and a service, on a mobile device associated with the recipient; selecting one or more additional details subsequent to selecting the one or more unique characters or pictures, wherein the one or more additional details are used in the application or service; and sending the message to a mobile device associated with the recipient with the one or more unique characters or pictures and the one or more additional details.

In another exemplary embodiment, a contextual messaging method implemented through a mobile device associated with a recipient of a message includes receiving the message from a mobile device associated with a sender via a messaging application; parsing the message to detect one or more unique characters or pictures configured to trigger one or more of functionality, an application, and a service, on the mobile device and one or more additional details associated with the one or more unique characters, wherein the one or more additional details are used in the application or service; triggering the functionality, the application, or the service subsequent to detection of the one or more unique characters or pictures, wherein the application or service are provided the one or more additional details; and performing one or more actions in the application or service with the one or more additional details. The unique characters or pictures can include emojis, emoticons, buttons, or icons representing an associated application or service.

In a further exemplary embodiment, a mobile device includes a network interface communicatively coupled to a network; a location determination device configured to identify a location of the mobile device; a processor communicatively coupled to the network interface and the location determination device; and memory storing instructions that, when executed, cause the processor to: execute a messaging application; detect one or more unique characters or pictures in a message through the messaging application; execute one or more applications or services responsive to detection of the one or more unique characters or pictures in the message; and provide one or more additional details to the one or more applications or services, wherein the one or more additional details are associated with the one or more unique characters or pictures. The unique characters or pictures can include emojis, emoticons, buttons, or icons representing an associated functionality, application or service. The one or more functionalities, applications or services can include any of a reminder, a calendar, a mapping algorithm, a checklist, an address book, and any application offering Application Program Interfaces (APIs).

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Figure 1:
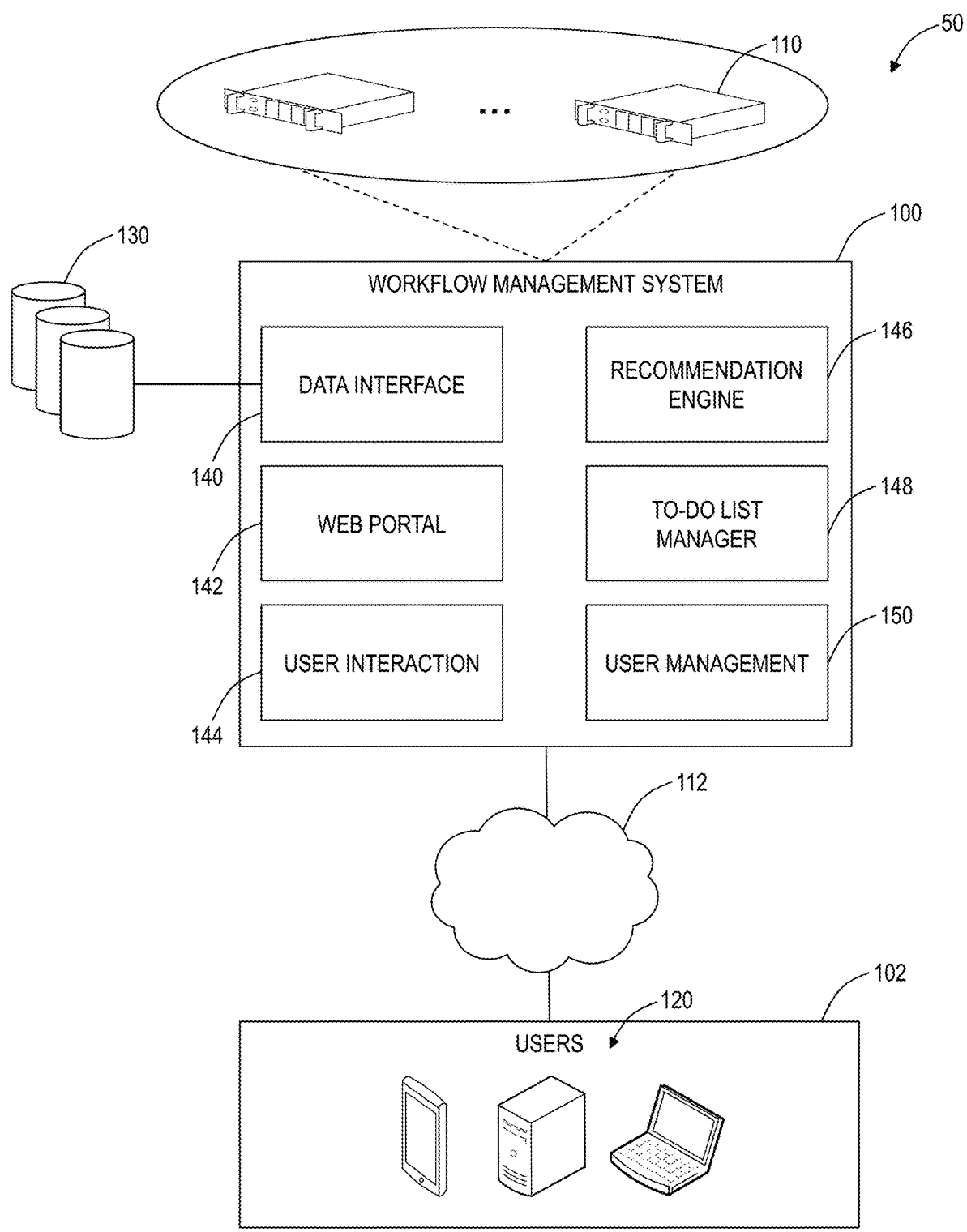
FIG. 1 is a network diagram of a workflow system including a workflow management system communicatively coupled to various users.

In various exemplary embodiments, contextual messaging systems and methods are implemented in a messaging platform that is configured to trigger functionality, an application, and/or a service, based on message content. Contextual messaging can be described as making things happen based on content in the messages. Accordingly, repetitive habits can be simplified through integrations, automation, and intelligence in the messaging platform. In one context, the messaging platform acts as an Artificial Intelligence (AI)-based anticipatory assistant, leveraging context, content, and intent to build tasks, appointments, to-do items, location, etc. In operation, the messaging platform uses emojis, emoticons, icons, buttons, or other unique characters in a message to trigger functionality, apps, and/or services on a user's mobile device. Thus, a message is not merely content, but also a trigger for reminders and calendars, maps, checklists or to-do lists, and the like. In this manner, a user's interaction with a mobile device is streamlined, removing a vast number of extra steps, clicks, touches, etc. For example, a simple message "let's get dinner tonight at 7 pm at Capannina," conventionally requires a recipient to 1) add a calendar event for 7 pm for 2) dinner with 3) the message sender and 4) add the location in the calendar event, etc. This process takes various steps when the content could be automatically integrated based on the systems and methods described herein.

Business Workflow Management Systems and Methods

Also, in various exemplary embodiments, business workflow management systems and methods optimized for small to medium-sized businesses are described. The systems and methods can include a recommendation engine to parse through data to provide a finite and optimized to-do list to business owners and employees to optimize business operation and overall productivity. For example, the recommendations in the to-do list are based on data analysis using a plurality of factors such as context, time, efficiency, etc. It is an objective of the systems and methods to be a virtualized assistant for business owners and employees. In this manner, the systems and methods are focused on the needs and objectives of business owners in the context of running a more efficient business. As an example, conventional accounting software can provide various known reports, graphs, etc. However, business owners and employees often do not comb over such reports, graphs, etc. to see what to do next. The systems and methods provide concrete recommendations based on analyzing the data, context, and the like. One such recommendation can include contacting a client or customer who typically pays invoices on time, but is currently behind. Furthermore, such a recommendation can be made in the context of lower funds being available in the company's operating accounts. That is, the recommendations seek to be relevant, actionable, and contextually-driven to optimize business operations recognizing that small and medium-sized businesses have finite resources during ongoing operations.

The systems and methods leverage the emerging IT infrastructure of computationally powerful mobile devices, ubiquitous network connectivity to the cloud, and the like. In this manner, the systems and methods recognize that small to medium-sized businesses do not have the resources for rich IT infrastructures. A further objective is to act as a companion to the business owners and employees recognizing that complex software tools have a high barrier to entry to be useful. Furthermore, the systems and methods recognize that users are managing their personal and work life in an integrated fashion. Additionally, some users (e.g., accountants, contractors, etc.) can have multiple different employers. In this manner, users may wear different "hats." To be useful, the systems and methods have to integrate the usage trend to manage the to-do list in a seamless fashion between each user's different "hats." The systems and methods start with a problem—business owners and employees have a finite amount of time and resources and must keep focus on the core business. With that in mind, the systems and methods seek to operate as a companion providing contextually-derived tasks as well as user-defined tasks to users, including both business, personal, and the like.

The systems and methods utilize a premise that each user has different contexts or "hats" such as at least a personal context and a work context. The objective is to make the user more effective in each of these contexts in a merged, integrated, and streamlined fashion. At a base level, the systems and methods provide recommendations to users in the form of a task list or to-do list. Recommendations can be both based on the personal and work context. For example, personal recommendations can be derived based on making the user more effective in performing normal tasks while business related recommendations can be derived based on financial information to make the business more productive and efficient. Again, the objective is to provide streamlined and actionable recommendations in a single list. The systems and methods provide a task-oriented view to the user as opposed to the conventional control-oriented view. By task-oriented view, the user does not require expertise in interacting with the systems and methods, but rather is presented with actionable tasks. In the conventional control-oriented view, the user has data and is responsible for parsing the data to figure out the actionable tasks. Thus, the user does not need to bring specialized knowledge such as financial literacy to bear in using the systems and methods. Rather than pour over financial data, the systems and methods perform such tasks in an automated and intelligent fashion to determine an optimal task based thereon.

In an exemplary embodiment, a method includes communicating via a workflow management system, implemented through a server, to a client device associated with a user to automatically derive a context associated with the user, wherein the client device is a mobile device configured to determine a location of the user and to provide the location to the workflow management system, and wherein the context is in part determined by the location and by a current persona of the user; analyzing data in a plurality of data sources via a recommendation engine of the workflow management system to automatically generate contextually-derived tasks for the user, wherein the contextually-derived tasks are relevant, selective, and actionable based on the context to optimize workflow and efficiency of the user; managing a to-do list for the user including the contextually-derived tasks and user-defined tasks, wherein the contextually-derived tasks are automatically derived by the recommendation engine and the user-defined tasks are created by the user; and selectively updating the to-do list based on changes in the user's context, as determined by the workflow management system based on the location from the mobile device, and ongoing analysis of the data. The plurality of data sources can include financial and transaction data sources of one or more organizations and at least one additional data source unrelated to financial and transaction data. The method can further include providing the contextually-derived tasks from the recommendation engine based on a plurality of factors associated with the one or more organizations and associated financial and transaction data and with the user and the associated context.

The method can further include receiving a user-defined task and including the user-defined task in the to-do list, wherein the user-defined task include one or more of an appointment, a user-generated task, or a task generated by another user and delegated to the user. The to-do list can be a federated list of all tasks for the user across all personas associated with the user, and wherein the personas include a work persona and a personal persona of the user. The method can further include performing integrated time management in conjunction with the to-do list of the user thereby tracking time spent on each task in the to-do list and providing the time spent as tentative time records of the user. The method can further include registering the user for the workflow management system; and assigning one or more personas to the user based on the data sources, wherein the one or more personas include personal information of the user and information related to one or more organizations associated with the user, and wherein the one or more personas can include a work persona and a personal persona of the user. The method can further include managing the to-do list with tasks for each of the one or more personas of the user in an integrated manner; and automatically sorting the to-do list responsive to changes in the context of the user, based on the data automatically captured by the client device and provided to the workflow management system. The method can further include receiving a notification from a task owner upon completion of each of the contextually-derived tasks. The method can further include synchronizing the to-do list with a calendar thereby incorporating calendar items in the to-do list. The method can further include receiving data capture from a client device of the user and integrating associated data in the workflow management system or the plurality of data sources.

In another exemplary embodiment, a workflow management system, implemented through a server, includes a network interface communicatively coupled to a user through a network; a data store communicatively coupled to a plurality of data sources; a processor communicatively coupled to the network interface and the data store; and memory storing instructions that, when executed, cause the processor to perform the steps of: communicating to a mobile device associated with the user to automatically derive a context associated with the user, wherein the mobile device is configured to determine a location of the user and to provide the location to the workflow management system, and wherein the context is in part determined by the location and by a current persona of the user; analyzing data in the plurality of data sources via a recommendation engine to automatically derive contextually-derived tasks for the user, wherein the contextually-derived tasks are relevant, selective, and actionable based on the context to optimize workflow and efficiency of the user; managing a to-do list for the user including the contextually-derived tasks and user-defined tasks, wherein the contextually-derived tasks are automatically derived by the recommendation engine and the user-defined tasks are created by the user; and selectively updating the to-do list based on changes in the user's context, as determined by the workflow management system based on the location from the mobile device, and ongoing analysis of the data. The plurality of data sources can include financial and transaction data sources of one or more organizations and at least one additional data source unrelated to financial and transaction data.

The instructions, when executed, can further cause the processor to perform the steps of: providing the contextually-derived tasks from the recommendation engine based on a plurality of factors associated with the one or more organizations and associated financial and transaction data and with the user and the associated context. The instructions, when executed, can further cause the processor to perform the steps of: receiving a user-defined task and including the user-defined task in the to-do list, wherein the user-defined task include one or more of an appointment, user-generated tasks, and tasks generated by other users and delegated to the user; wherein the to-do list is a federated list of all tasks for the user across all personas associated with the user, the personas include a work persona and a personal persona of the user. The instructions, when executed, can further cause the processor to perform the steps of: performing integrated time management in conjunction with the to-do list of the user thereby tracking time spent on each task in the to-do list and providing the time spent as tentative time records of the user. The instructions, when executed, can further cause the processor to perform the steps of: registering the user for the workflow management system; assigning one or more personas to the user based on the data sources, wherein the one or more personas include personal information of the user and information related to one or more organizations associated with the user, and wherein the one or more personas include a work persona and a personal persona of the user; managing the to-do list with tasks for each of the personas of the user in an integrated manner; and sorting the to-do list based as the context and location of the user changes. The instructions, when executed, can further cause the processor to perform the steps of: receiving a notification from a task owner upon completion of each of the contextually-derived tasks.

In a further exemplary embodiment, a client device includes a network interface communicatively coupled to a workflow management system, implemented through a server, through a network; a location determination device configured to identify a real-time location of the client device; a processor communicatively coupled to the network interface and the location determination device; and memory storing instructions that, when executed, cause the processor to perform the steps of: communicating data automatically captured by the location determination device to the workflow management system to enable the workflow management system to automatically derive a context associated with the user, wherein the context is in part determined by the location and by a current persona of the user; receiving contextually-derived tasks for the user, wherein the contextually-derived tasks for the user are responsive to data in a plurality of data sources that is analyzed by a recommendation engine in the workflow management system, wherein the contextually-derived tasks are relevant, selective, and actionable based on the context to optimize workflow and efficiency of the user; managing a to-do list for the user including the contextually-derived tasks and user-defined tasks, wherein the contextually-derived tasks are automatically derived by the recommendation engine and the user-defined tasks are created by the user; and selectively updating the to-do list based on changes in the user's context, as determined by the workflow management system based on the location from the location determination device, and ongoing analysis of the data. The contextually-derived tasks can be one of personal tasks derived based on making the user more effective in performing tasks related to the user and business tasks derived based on financial information to make a business, associated with the user, more productive and efficient.

Referring to FIG. 1, in an exemplary embodiment, a network diagram illustrates a workflow system 50 including a workflow management system 100 communicatively coupled to various users 102. The workflow management system 100 operates on one or more servers 110 which are communicatively coupled to a network 112. The network 112 can be one or more networks which ultimately connect the workflow management system 100 to various client devices 120 associated with the various users 102. For example, the network 112 can include, without limitation, a combination of the Internet, Local Area Networks (LANs), Virtual LANs (VLANs), wireless networks (WLANs, wireless service providers), wired networks (cable, fiber optic, DSL, etc.), enterprise and corporate networks, and the like. The users 102 can each have one of the client devices 120 that are also communicatively coupled to the network 112. The client devices 120 can include, without limitation, a smartphone, a tablet, a netbook, an ultrabook, a laptop, a desktop, a personal digital assistant, and the like. The workflow management system 100 can also be communicatively coupled to one or more data sources 130 such as via the network 112 or the like. The data sources 130 generally include business and/or personal data associated with the users 102 and/or businesses. For example, the data sources 130 can include, without limitation, accounting data, time sheet data, calendar and meeting data, electronic mail (email), stored documents, user location data, and the like. That is, the data sources 130 are generally data related to business operations—both day-to-day and longer term, strategic information as well as individual user data. In various exemplary embodiments, the workflow management system 100 is configured to interface with the data sources 130 (or even actively manage the data sources 130) to provide contextually-derived and user-derived tasks to the various users 102.

Exemplary Server and Mobile Device

Figure 2:
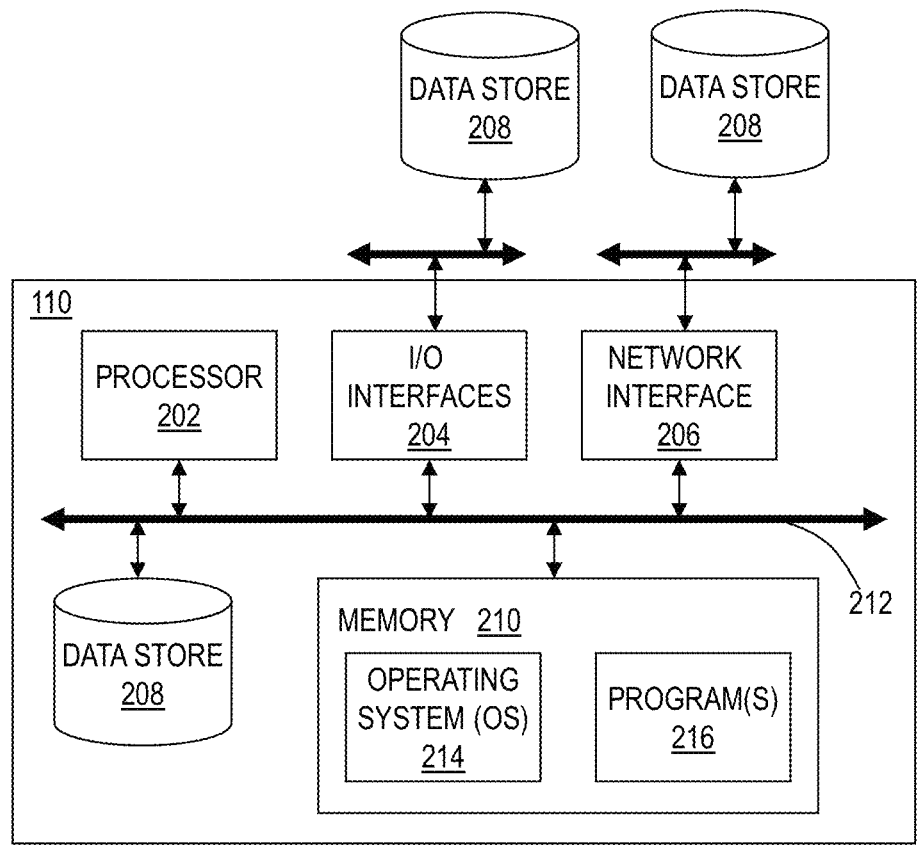
FIG. 2 is a block diagram of an exemplary implementation of a server which may be utilized in the workflow management system of FIG. 1.
Figure 3:
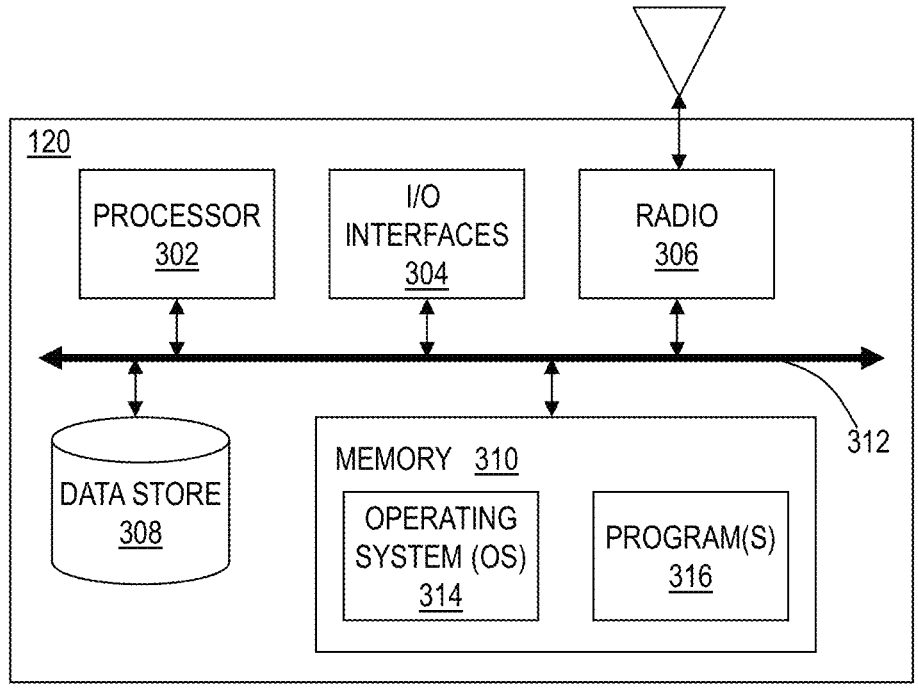
FIG. 3 is a block diagram of an exemplary implementation of a client device which may be utilized in the workflow management system of FIG. 1.

Referring to FIGS. 2 and 3, in an exemplary embodiment, a block diagram illustrates an exemplary implementation of a server 110 and a client device 120 which may be utilized in the workflow management system 100. The server 110 and the client device 120 may each be a digital computer that, in terms of hardware architecture, generally includes a processor 202, 302, input/output (I/O) interfaces 204, 304, a network interface 206 for the server 110, a radio 306 for the client device 120, a data store 208, 308, and memory 210, 310. It should be appreciated by those of ordinary skill in the art that FIGS. 2 and 3 depict the server 110 and the client device 120 in an oversimplified manner, and a practical embodiment may include additional components and suitably configured processing logic to support known or conventional operating features that are not described in detail herein. The components (202, 204, 206, 208, 210, 302, 304, 306, 308, 310) are communicatively coupled via a local interface 212, 312. The local interface 212, 312 may be, for example, but not limited to, one or more buses or other wired or wireless connections, as is known in the art. The local interface 212, 312 may have additional elements, which are omitted for simplicity, such as controllers, buffers (caches), drivers, repeaters, and receivers, among many others, to enable communications. Further, the local interface 212, 312 may include address, control, and/or data connections to enable appropriate communications among the aforementioned components.

The processor 202, 302 is a hardware device for executing software instructions. The processor 202, 302 may be any custom made or commercially available processor, a central processing unit (CPU), an auxiliary processor among several processors associated with the server 110 and the client device 120, a semiconductor-based microprocessor (in the form of a microchip or chip set), or generally any device for executing software instructions. When the server 110 and the client device 120 is in operation, the processor 202, 302 is configured to execute software stored within the memory 210, 310, to communicate data to and from the memory 210, 310, and to generally control operations of the server 110 and the client device 120 pursuant to the software instructions. Note, the processor 310 may include a mobile-optimized architecture whereas the processor 210 may include a server-optimized architecture. The I/O interfaces 204, 304 may be used to receive user input from and/or for providing system output to one or more devices or components. User input may be provided via, for example, a keyboard, touch pad, stylus, voice commands, and/or a mouse. The system output may be provided via a display device, audible indicia, and a printer (not shown). I/O interfaces 204, 304 can include, for example, a serial port, a parallel port, a small computer system interface (SCSI), an infrared (IR) interface, a radio frequency (RF) interface, a universal serial bus (USB) interface, and/or any proprietary interfaces (e.g. 19 pin or 30 pin connectors). The I/O interfaces 204, 304 can include a graphical user interface (GUI) that enable user interaction. Furthermore, the I/O interfaces 204, 304 may include a camera and/or video camera device.

The network interface 206 may be used to enable the server 110 to communicate over a network, such as the Internet and the like, etc. For example, the server 110 can utilize the network interface 206 to communicate to/from the plurality of users 102, etc. The network interface 206 may include, for example, an Ethernet card or adapter (e.g., 10BaseT, Fast Ethernet, Gigabit Ethernet) or a wireless local area network (WLAN) card or adapter (e.g., 802.11a/b/g/n). The network interface 206 may include address, control, and/or data connections to enable appropriate communications on the network. The radio 306 enables wireless communication between the client device 120. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation) or other WLAN variant; IEEE 802.16 (WiMAX or any other variation); any 3G/4G Long Term Evolution (LTE) related protocols; paging network protocols; magnetic induction; satellite data communication protocols; GPRS; Global Positioning Satellite (GPS); and any other wireless data communication protocols. For example, the radio 306 can have multiple functions such as, without limitation, communication via a wireless service provider using 3G/4G, communication via a WLAN, and location determination via GPS.

The data store 208, 308 may be used to store data. The data store 208, 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208, 308 may incorporate electronic, magnetic, optical, and/or other types of storage media. In one example, the data store 208 may be located internal to the server 110 such as, for example, an internal hard drive connected to the local interface 212 in the server 110. Additionally in another embodiment, the data store 208 may be located external to the server 110 such as, for example, an external hard drive connected to the I/O interfaces 204 (e.g., SCSI or USB connection). In a further embodiment, the data store 208 may be connected to the server 110 through a network, such as, for example, a network attached file server. In the context of the client device 120, the data store 308 is typically local to the device although the client device 120 can also access external data stores in a manner similar to the server 110.

The memory 210, 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210, 310 may incorporate electronic, magnetic, optical, and/or other types of storage media. Note that the memory 210, 310 may have a distributed architecture, where various components are situated remotely from one another, but can be accessed by the processor 202, 302. The software in memory 210, 310 may include one or more software programs, each of which includes an ordered listing of executable instructions for implementing logical functions. The software in the memory 210, 310 includes a suitable operating system (O/S) 214, 314 and one or more programs 216, 316. The operating system 214, 314 essentially controls the execution of other computer programs, such as the one or more programs 216, 316, and provides scheduling, input-output control, file and data management, memory management, and communication control and related services. The programs 216, 316 can include an application operating the system 100 on the server 110 and "apps" operating the system 100 on the client devices 104. The programs 216 can include the workflow management system 100, and the programs 316 can include client-side apps on the client devices 120 for interfacing with the workflow management system 100 or browser applications for interfacing over the Web to the workflow management system 100.

Referring back to FIG. 1, the workflow management system 100 can include various functional components such as, without limitation, a data interface 140, a Web portal 142, a user presentation function 144, a recommendation engine 146, a to-do list manager 148, and a user management function 150. These various functional components 140-150 are implemented on the servers 110 as software being executed by the processor 202 to perform various functions for the workflow management system 100 that are described as follows. Those of ordinary skill in the art will recognize the various functional components 140-150 can be combined or separated further, and each has various communications between the other components. Specifically, the various functional components 140-150 are described herein in a functional context for operating the workflow management system 100 and actual implementations may differ with more or less functional components, but with the same overall functionality.

The data interface 140 is configured to interface with the data sources 130. Functionally, the data interface 140 is responsible for transmitting and receiving data from the data sources 130 for use in the workflow management system 100. As described herein, the data sources 130 can generally include any data related to a business, organization, or the users 102. Specifically, the data sources 130 can include multiple financial and transaction data sources or the like. In an exemplary embodiment, the workflow management system 100 is configured to interface to external data sources 130 such as accounting packages, time management systems, email systems, document management systems, ERP systems, client contact management systems, and the like. For example, the data sources 130 can include financial packages with Application Programming Interfaces (APIs) for connection therewith. Additionally, it is also contemplated that the workflow management system 100 manages its own data as well including data related to any of the aforementioned systems. Thus, the data sources 130 may be external, internal, or a combination thereof to the workflow management system 100 as well as actively managed, passively managed, or a combination thereof by the workflow management system 100.

The Web portal 142 enables the users 102 to interact with the workflow management system 100 via a browser application that is executed locally on the client device 120. That is, the Web portal 142 communicates with the client device via various Web related protocols (e.g., Hypertext Markup Language (HTML)) and the like. The user interaction function 144 enables the users 102 to interact with the workflow management system 100 via direct exchange of data between the server 110 and an application on the client device 120. Further, the user interaction function 144 is configured to interface data with a graphical UI in the Web portal 142 for user interaction with the workflow management system 100. In an exemplary embodiment, the client device 120 includes an application program for interfacing with the workflow management system 100. The user interaction function 144 has a data connection with the application program for receiving and transmitting data. In this manner, the user interaction function 144 interacts with the users 102 to provide a to-do list with integrated timekeeping, with our workflow and mechanisms (tentative time records, reconciliation, etc.) for presenting selective, action-oriented, and narrowly-focused recommendations from the data sources 130.

Further, the user interaction function 144 contemplates intermittent communications between the client device 110 and the server 120 based on network availability. In this manner, the client device 110 can preserve data for operation while off-line and perform synchronization when on-line with the server 120. In an exemplary embodiment, the workflow management system 100 is a cloud-based architecture where the server 110 (or multiple servers 110) is in the cloud with connections to the data sources 130 with the client devices 120 intermittently connected to the server 110 but able to operate in a persistent state when disconnected. In an exemplary embodiment, the user interaction function 144 enables a local UI on the client device 120 to interface with the server 110. For example, the UI is local to the client device 120 such as using Javascript, JavaScript Object Notation (JSON), etc. The client device 120 operates as a presentation device for the UI without performing too much processing—this is reserved for the server 110. The server 110 and the client device 120 are not sending a lot of data back and forth, but rather minimizing communication to preserve network bandwidth with search and analysis functions performed in the cloud at the server 110. In an exemplary embodiment, as described herein, the client device 120 can be a mobile device such as a smartphone, tablet, or some combination. Note, despite intermittent communications, the workflow management system 100 includes synchronization between the client device 120 and the server 110 managing data in a single state.

The workflow management system 100 recognizes that on a small-form factor device such as a mobile device, presentation space is limited and it is not useful to download and present a lot of data in spreadsheets, reports, graphs, etc. Rather, the intent of the workflow management system 100 is to present focused recommendations based on the back-end processing of the data at the server 110. In this manner, there is not a need to download a lot of data between the server 110 and the client device 120 thereby reducing complexity of the software and processing on the client device 120. For example, it is less efficient to present a user with an aging report on a mobile device than it is to present actionable recommendations based on the aging report on the mobile device—in this example, to call a specific client whose bill is past due. The objective of the workflow management system 100 is to engage the user in a convenient, optimized manner regardless of platform, but in an exemplary embodiment, the workflow management system 100 recognizes the migration to smaller form-factor devices and is focused on optimization thereof.

The recommendation engine 146 conceptually resides between the data sources 130 via the data interface 140 and the users 102 via the Web port 142 and/or the user interaction function 144. The recommendation engine 146 further interacts with the to-do list manager 148 to populate data contained therein, i.e. the recommendation engine 146 feeds the to-do list manager 148. As described herein, the recommendation engine 146 recognizes that small and medium-sized business owners and employees wear multiple hats and are not necessarily experts in dealing with all the intricacies of operating a business optimally. Further, the recommendation engine 146 realizes that significant amounts of data exist in the context of small and medium-sized businesses that simply is not combed over and optimized due to the numerous demands and resource limitations of the owners and employees. In this manner, the recommendation engine 146 is an artificial intelligence function that parses data in the data sources 130 and provides selective, action-oriented, and narrowly-focused recommendations. That is, the recommendation engine 146 analyzes the data to figure out interesting and useful data for translation into actionable recommendations based thereon. The recommendation engine 146 is designed within the constructs that small to medium-sized businesses are short on time and cash, but otherwise need to improve effectiveness.

In an exemplary embodiment, the recommendation engine 146 can include financial related recommendations based on reviewing financial or accounting data in the data sources 130. For example, business owners and employees may have some degree of financial illiteracy or simply be too busy to comb over financials on a regular basis to optimize business operation. Here, the workflow management system 100 can feed off mirrored financial and accounting data (e.g., mirrored QuickBooks-integrated data). Also, the workflow management system 100 can also maintain financial and accounting data in an integrated manner. The objective here is to mine this financial data so that the business owner and employees do not have to do deep dives. Rather, the recommendation engine 146 seeks to act as a business companion to provide finite, actionable recommendations from the data. The recommendation engine 146 is providing recommendations, not data. Again, with the realization that resources are limited, the recommendation engine 146 does not seek to inundate business owners and employees with hundreds of tasks or action items, but rather a finite, reasonable set selected based on context, situation, and the like to have maximum impact on business optimization. Additionally, the recommendation engine 146 can also include personal recommendations related to making the user more effective.

The recommendation engine 146 can practically provide any type of context-derived task. It is the objective of the workflow management system 100 to parse and analyze the data in the data sources 130 to derive narrowly-focused recommendations, via the recommendation engine 146, from multiple financial and transaction data sources. For example, if days sales outstanding (DSOs) are high based on a review of the data by the recommendation engine 146, a concrete recommendation can include contacting specific overdue customers or clients. In this manner, the business owner or employees are not merely presented a receivables aging report, but rather actionable recommendations based thereon. The recommendation engine 146 is an intelligent engine that creates tasks, encoding workflow directly into tasks that are presented via the to-do list manager 148 rather than implicit creation of tasks. Thus, the recommendation engine 146 acts as a companion to the business owners and employees. Another exemplary recommendation can include noticing billing has slowed down, but invoices are ready to be sent. Here, the recommendation engine 146 can create specific billing tasks. Further, the specific billing tasks can be created concurrently with project completion as the recommendation engine 146 monitors time management or project management data.

The recommendation engine 146 can also break down tasks in the event specific tasks are "stuck" meaning little progress is being made for complex tasks. That is, tasks may be split into multiple tasks or different phases as well as combined into unified tasks. For example, consider the example of climbing Mt. Everest as an exemplary task. This is clearly a large, complex task, but it can be tackled in multiple tasks broken down. The recommendation engine 146 can be configured to parse and split tasks to better improve personal effectiveness. In the example of climbing Mt. Everest, the task can be broken down into a first task of obtaining information on the climb such as getting a book on climbing Mt. Everest. Furthermore, the recommendation engine 146 can use these techniques when it is determined that a user is stuck on a particular task—identify that a task is "stuck" and encourage the user to break it down further for improved effectiveness. For example, the recommendation engine 146 can suggest that the user try and break down a large task.

In an exemplary embodiment, one aspect of the workflow management system 100 includes integration with the data source 130 being accounting or financial information. For example, the data source 130 could be QuickBooks or some other financial software package. It is the intent of the recommendation engine 146 to sit between QuickBooks and the user to analyze and parse the financial data to provide concrete, actionable tasks based thereon. The objective is to make the analytics concrete and task oriented for users who do not have a significant knowledge of finance and accounting. In this exemplary embodiment, the interface between QuickBooks and the server 110 can be in the cloud, using an API to interface data between QuickBooks and the server 110. In practice, QuickBooks (or any other financial software package) is operating at a business's location or some other location. The server 110 includes the data interface 140 with a connector to interface data from QuickBooks. The analysis and recommendations are done in the cloud and push down to the client device 120 for action based thereon.

The to-do list manager 148 interacts with the recommendation engine 146, the Web portal 142, the user interaction function 144, and the user management function 150 to actively manage a to-do or task list for each of the users 102. In the context of the workflow management system 100, a to-do or task list is an organizing principle, i.e. a nucleus of the overall system. Here, interaction between the users 102 and the workflow management system 100 is simplified— each of the users 102 is presented a to-do or task list (to-do and task list may be used interchangeably)—workflow is implicit, i.e. tasks are delegated, shared, etc. with concrete deliverables and timing, thus the user 102 knows what to do based on the tasks. Tasks are an efficient method of tracking workflow. Each task has an assigned owner, possible deadline, and concrete action. Each task may further include interested users 102 who are notified of the task completion and/or progress. This enables follow-up and closure. Also, meetings, appointments, etc. can also be defined as tasks which are scheduled at specific times. For example, these can be user-defined tasks. Other user-defined tasks can include, without limitation, user-generated tasks, tasks generated by other users and delegated, and the like Further, the to-do list manager 148 can be synchronized with a user's 102 calendar both on the client-side (the client device 120) and on the server-side (e.g., the server 110, or another server operating a calendar application).

In an exemplary embodiment, the workflow management system 100 manages a user's calendar in a unique and integrated fashion with the to-do list. That is, with a realization that effectiveness is maximized by putting everything that is to be done into a single list, appointments from the calendar are integrated into the to-do list and managed as a single list of tasks. By managing calendar items such as appointments and tasks together, the workflow management system 100 can subordinate items to one another. For example, a user may need to complete an appointment to make progress on the larger task. In such a case, the workflow management system 100 can withhold or block presentation of the larger task until completion of the appointment. In this manner, linkages can be expressed in a natural way, e.g. once the appointment occurs, the associated task can be active again. Here, the workflow management system 100 minimizes the presentation of tasks to the user to the most pertinent and actionable at any given time thereby improving effectiveness. The workflow management system 100 can mirror tasks to/from a user's calendar as well such that the user does not have to manage manually two separate items—the calendar and the to-do list. In an exemplary embodiment, the calendar and task list synchronization can occur on the client-side using standard APIs associated with calendar software although this could also be done on the server-side. Further, the workflow management system 100 can operate natively on the client device 120 in a disconnected mode (where the mobile device 120 is not connected to the server 110 for some reason) thereby ensuring the calendar and task list maintain synchronization. This is less likely in managing the calendar and task list synchronization on the client side.

The to-do list manager 148 manages tasks for each of the users 102 based on their associated roles, specializations, etc. as well as their own personal data. The user interaction function 144 and/or the Web portal 142 present the to-do list with tasks as a dashboard for the users 102. For example, the client device 120 can include the task list via an installed app that has push or other type of notifications. Further, the users 102 can receive tasks based on their roles and specializations. That is, business owners will receive different tasks than sales managers, etc. The intent with the tasks is to improve the effectiveness of the business owner as well as associated employees. The dashboard is easy to navigate as the main interaction between the user 102 and the workflow management system 100 is the task list. The user 102 can update the task list dynamically from the client device 120. Further, the workflow management system 100 can have built-in intelligence related to tasks. For example, if a current task is to attend a meeting at a certain time, the workflow management system 100 can determine that the user 102 (and other users 102) are at the meeting based on location information from their associated client devices 120. Here, the user 102 would not need to update the task list; instead it can be automatically set to complete or in-progress based on this passive data capture.

The root problem with conventional to-do lists is that the users 102 are overwhelmed with tasks, causing them to ignore the to-do list entirely and making them less effective. The workflow management system 100 via the recommendation engine 146 addresses these concerns by picking a few tasks which provide the most benefit based on the context, time, etc. providing narrow focus for the users 102 and prioritization. For example, if the user 102 has to return phone calls, the recommendation engine 146 and the to-do list manager 148 recognize that it is more efficient to batch these together rather than spread them out thereby improving the effectiveness of the user 102. Overall, the workflow management system 100 seeks to improve the effectiveness of the business owner and employees. The effectiveness is managed in two dimensions—time and cash, and the realization that both of these are scarce in the context of small to medium-sized business. These businesses are limited by the limited scalability of the owners, principals, or employees. Small business owners often find it is difficult to delegate tasks related to running the business, i.e. follow-up is difficult, etc. The to-do list manager 148 can include built-in tools for automatic follow-up and the like.

The workflow management system 100 can also include a time management function. This can be integrated or external to another time management system via the data interface 130. The time management function can include keeping track of each of the user's 102 time, location, etc. as well as their work on associated tasks. For example, in a professional services firm, the tasks can be tracked with the time management function for later billing. That is, the workflow management system 100 can generally track the user's 102 work on the tasks thereby automating relevant transactions. This can include tying timekeeping to the to-do list in a complete solution for a professional services firm. Also, actual time spent working on tasks can be one of the data inputs into the recommendation engine 146 for processing thereof. Further, the workflow management system 100 can be integrated with a phone or email system and use its intelligent engine to track emails, phone calls, etc. for integration into the time management function. The time management function can provide tentative time record subject to approval, time record reconciliation across users 102, and the like.

Additionally, the workflow management system 100 can make use of the rich location tracking features associated with the client devices 120. Specifically, an exemplary data source 130 can include real-time or substantially real-time location information for each of the users 102. The workflow management system 100 contemplates using this location information for the context in assigning tasks via the recommendation engine 146 as well as for determining ongoing tasks, etc. As described herein, the recommendation engine 146 provides context-derived tasks. In this manner, the location provides a significant context for which task to assign. For example, a business owner who may be on a business trip or vacation would not be in a position to necessarily contact overdue clients for payment. Further, meeting attendees can automatically be tracked and a task to attend a meeting can be automatically marked as completed or in-progress. Further, the business owner can use the workflow management system 100 to determine location and time management of employees. For example, how long were certain employees at a worksite? This information can be fed into the time management function as well for invoicing, tracking, etc. Additionally, the to-do list manager 146 can update the task list order based on the location information to provide more relevance and efficiency to the user 102.

Also, the workflow management system 100 can combine the time management function and the location information for passive data capture to assist the users 102. For example, at a business lunch, the workflow management system 100 can be aware of the meeting based on the task list, the location information, etc. The workflow management system 100 can interact with the accounting system to mark any expenses for the business lunch as a deductible or reimbursable expense. Also, the user 102 can simply take a picture of the receipt or pay with the client device 120, and this information can be passively capture and all of the back office information updated automatically. Again, the objective of the workflow management system 100 is to act as a companion or business assistant to the users 102, automating and tracking tasks in whatever manner is conceivable.

The user management function 150 provides a mechanism for the users 102 to register and configure their interaction with the workflow management system 100. The user management function 150 includes a user registration function to register the users 102, their associated client devices 120, and denote their associations with organizations served by the workflow management system 100. Specifically, the user management function 150 can associate a user 102 with various data sources 130. The data sources 130 can be assigned individually and/or based on organization, business, etc. The workflow management system 100 seeks to provide each user 102 a single, unified task list for all tasks—business, personal, etc. This is a key objective of the functional efficiency of the workflow management system 100. Each of the users 102 has a specific user identity which is tagged to their business, clients, personal data, etc. Also, the users 102 can each have multiple personas that are all managed in an integrated manner by the workflow management system 100. Thus, there is one identity for each of the users 102 across multiple different points that are all managed seamlessly by the workflow management system 100 to provide a federated to-do list to the user 102. The user registration function can be across a community site via the Web portal 142, via integration of personal data by designating as appropriate data source 130, by associating one or more companies, and the like.

An exemplary application can include a financial or accounting professional who works as an independent contractor for multiple businesses. Here, the workflow management system 100 can manage all workflow via the to-do list for all of the multiple businesses as well as personal information. If the financial or accounting professional stops working for a specific business, the user management function 150 can simply remove that designation from that user's 102 profile. This provides a different spin on associating the user's 102—user 102 do not sign up for the company's workflow system, but rather for the workflow management system 100 which integrates with the company's data sources 130. This provides flexibility for the users 102 enabling moonlighting, personal information tracking, etc. in a single, unified manner. Further, the workflow management system 100 has applicability and advantages in the ever-changing business world. At present, information is actively provisioned into the client devices 120. The workflow management system 100 does the opposite—information is automatically added once the user 102 is associated with the data sources 130.

The workflow management system 100 can be offered as a service, e.g. Software-as-a-Service (SaaS), and via a cloud-based infrastructure. In this manner, the workflow management system 100 is not tied to a specific user's company like traditional accounting and other types of systems. Rather, users can sign up for an account on the workflow management system 100 and then be attached or assigned to various companies or organizations. Here, the user can maintain personal information via the workflow management system 100 as well as company information (or multiple companies). Since the workflow management system 100 is not tied specifically to a company or organization, there is a decoupling of resources. Thus, when a user leaves a company or organization, it can be noted in the workflow management system 100 and the associated resources detached while the user maintains her personal information already in the workflow management system 100. Thus, the workflow management system 100 can present a merged task list across a user's entire existence—personal and corporate. This avoids having to keep multiple lists and repositories of information. That is, users typically will have at least two contexts—work and personal context. The key to the workflow management system 100 is to keep them separate in the back end, i.e. at the server 110, allowing the user to keep the personal information when the work context changes. This is advantageous in enforcing privacy and maintaining continuity while presenting the user a merged view in the task list. This also is advantageous in the trend toward businesses to implement "Bring Your Own Device (BYOD)" policies, where businesses no longer provide devices to users, but rather users obtain their own personal mobile devices (e.g., smartphones, tablets, etc.) and use them for work as well.

Figure 4:
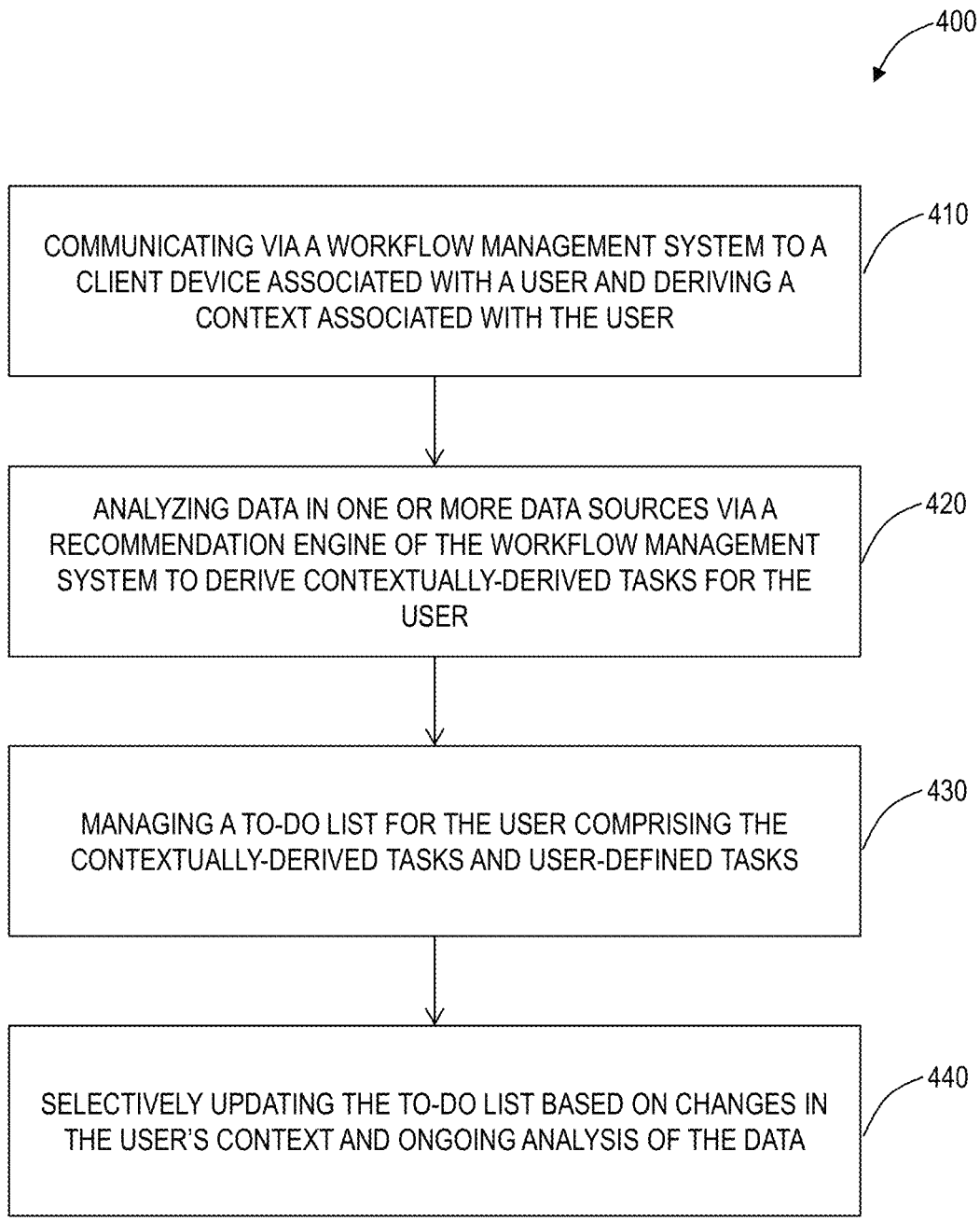
FIG. 4 is a flowchart of a workflow management method which may be utilized by the workflow management system of FIG. 1.

Referring to FIG. 4, in an exemplary embodiment, a flowchart illustrates a workflow management method 400 which may be implemented in the workflow management system 100. The method 400 includes communicating via the workflow management system 100 to a client device 120 associated with a user 102 and deriving a context associated with the user 102 (step 410). Here, the workflow management system 100 can be configured to continually communicate and track the user 102, having the specific context of where and what the user 102 is doing. This can be realized in part to the feature-rich functionality of the client device 120. Also, the workflow management system 100 has knowledge of the context of the business associated with the user 102. The method 400 include analyzing data in one or more data sources 130 via a recommendation engine 146 of the workflow management system 100 to derive contextually-derived tasks for the user 102 (step 420). The contextually-derived tasks are relevant, selective, actionable, and narrowly focused based on the context to optimize workflow and efficiency of the user 102. By relevant, the contextually-derived tasks are pertinent to a current situation of the user and/or the company. For example, a task to return phone calls is not necessarily relevant on a non-work day while it may be if the user is in the office on a work day. By selective, the contextually-derived tasks are limited in number as to not overwhelm the user or inundate the user. By actionable, the contextually-derived tasks are within the scope of the user's expertise to obtain completion of the task. Finally, by narrowly focused, the contextually-derived tasks are broken down into a manageable task such as a check on a specific client's past-due balance as opposed to collect more receivables simply, for example. The method 400 includes managing a to-do list for the user including the contextually-derived tasks and user-defined tasks (step 430). Finally, the method 400 includes selectively updating the to-do list based on changes in the user's context and ongoing analysis of the data (step 440).

Contextual Device

Figure 5:
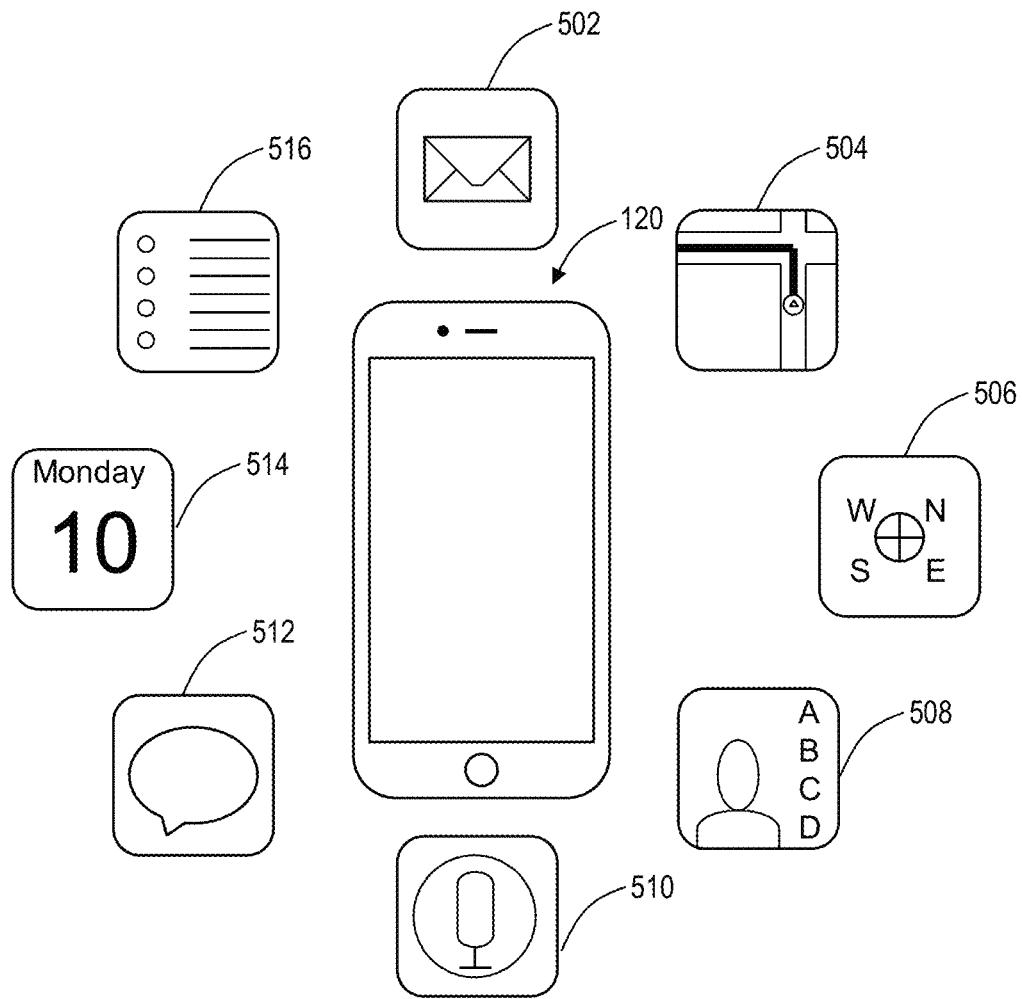
FIG. 5 is a diagram of a mobile device and associated applications.

Referring to FIG. 5, in an exemplary embodiment, a diagram illustrates a mobile device 120 and associated applications 502-516. The mobile device 120 is the first contextual device that is always with its user. Context awareness is a property of the mobile device 120 that is defined complementarily to location awareness. Whereas location may determine how certain processes in the mobile device 120 operate, context may be applied more flexibly with mobile users, especially with users of smartphones. Context awareness originated as a term from ubiquitous computing or as so-called pervasive computing which sought to deal with linking changes in the environment with computer systems, which are otherwise static. Context can be location, identity, activity, time, user and role, process and task, etc. As a contextual device, the mobile device 120 can both sense and react based on the environment—i.e., the messaging platform has information about the circumstances under which the mobile device 120 operates, and based on rules or an intelligent stimulus, react accordingly. Note, context is more than simply a matter of a user's location; rather, context encompasses all of the environment. The mobile device 120 supports context-aware messaging which uses messages to (a) adapt interfaces, (b) tailor the set of application-relevant data, (c) increase the precision of information retrieval, (d) discover services, (e) make the user interaction implicit, or (f) build smart environments.

FIG. 5 illustrates some exemplary applications, including mail 502, a map application 504, a compass 506, an address book 508, a microphone 510, a messaging application 512, a calendar 514, and a reminder list 516. Of course those of ordinary skill in the art will recognize that the mobile device 120 can include various other applications or "apps." Generally speaking, these applications 502-516 are used for productivity. Of course, there are other categories of apps available for the mobile device 120 as well. In an aspect of the contextual messaging systems and methods, the messaging application 512 is integrated with the other applications 502-510, 514-516. The mail 502 is an app for electronic mail. The map application 504 utilizes a location determination device associated with the mobile device 120 to provide maps, directions, etc. The compass 506 provides direction. The address book 508 keeps track of other users and their associated contact information. The microphone 510 provide audio input to the mobile device 120. The messaging application 512 is used for communication with other users. The calendar 514 keeps appointments for the user. Finally, the reminder list 516 is a task or to-do list for the user.

In an exemplary embodiment, the mobile device 120 includes a network interface communicatively coupled to a network; a location determination device configured to identify a location of the mobile device; a processor communicatively coupled to the network interface and the location determination device; and memory storing instructions that, when executed, cause the processor to: execute a messaging application; detect one or more unique characters or pictures in a message through the messaging application; execute one or more applications or services responsive to detection of the one or more unique characters or pictures in the message; and provide one or more additional details to the one or more applications or services, wherein the one or more additional details are associated with the one or more unique characters or pictures. The unique characters or pictures can include emojis, emoticons, buttons, or icons representing an associated functionality, application or service. The one or more applications or services can include any of a reminder, a calendar, a mapping algorithm, a checklist, an address book, and any application offering Application Program Interfaces (APIs). The one or more unique characters or pictures represent one or more of: a delegated task and the one or more additional details include the description of the delegated task, an invite to do something together and the one or more additional details include the description of the invite; a reminder or a calendar event and the one or more additional details include a date and/or time; a location and the one or more additional details include a geographic location, store, restaurant, or landmark; a checklist and the one or more additional details can include one or more entry for the checklist; and any item and the one or more additional details include the content passed to an API-ready application related to the item.

Messaging with Mobile Devices

Figure 6:
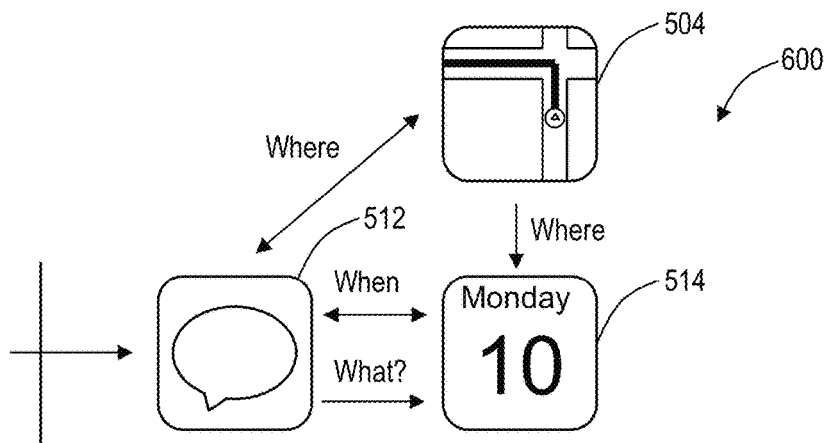
FIG. 6 is various diagrams of a messaging conversation and associated functions in the applications.
Figure 6:
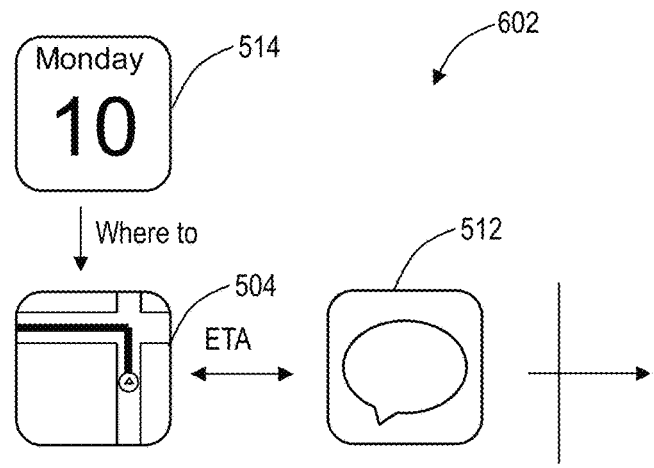
Figure 6:
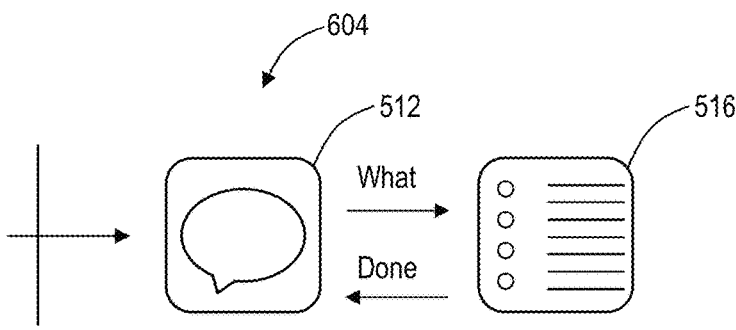

Referring to FIG. 6, in an exemplary embodiment, various diagrams illustrate a messaging conversation and associated functions in the applications 502-516. First, a messaging conversation 600 is shown for 'do you want to meet . . . ?' between two or more users with their associated mobile devices 120. In addition to communicating and deciding details via the messaging application 512, details such as where, when, and what need to be determined and input to the mobile device 120, such as through the applications 504, 514. Second, a messaging conversation 602 is shown for 'I'll see you "soon"' between two or more users with their associated mobile devices 120. Here, details include where to and when (Estimated Time of Arrival (ETA)) which can be through the applications 504, 514. Finally, a messaging conversation 604 is shown for 'Can you do . . . ?' between two or more users with their associated mobile devices 120. Conventionally, without the contextual messaging systems and methods, data from the messaging application 512 for the applications 502-510, 514-516 must be manually input. With the contextual messaging systems and methods, techniques are described for both the sender and the recipient to trigger automatically functionality, services, and apps based on content in messages from the messaging application 512.

Contextual Messaging Method—Sender

Figure 7:
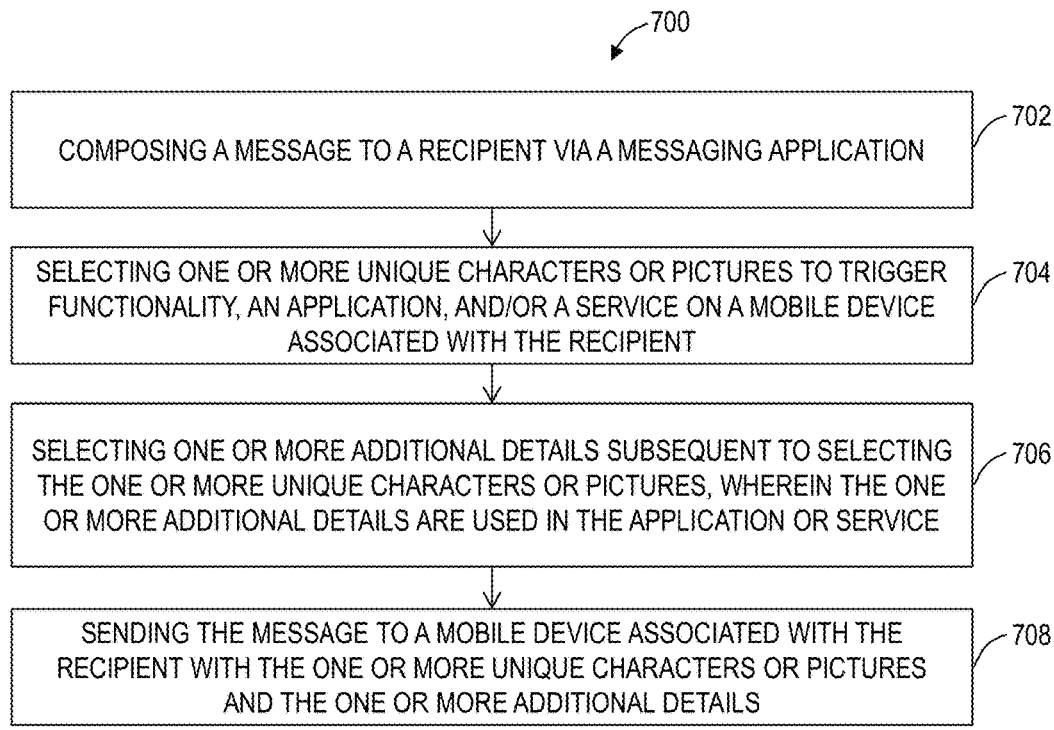
FIG. 7 is a flowchart of a contextual messaging method from a sender's perspective.

Referring to FIG. 7, in an exemplary embodiment, a flowchart illustrates a contextual messaging method 700. The contextual messaging method 700 is implemented on the mobile device 120 associated with a sender of a message. The contextual message method 700 includes composing a message to a recipient via a messaging application (step 702); selecting one or more unique characters or pictures to trigger functionality, an application, and/or a service, on a mobile device associated with the recipient (step 704); selecting one or more additional details subsequent to selecting the one or more unique characters or pictures, wherein the one or more additional details are used in the application or service (step 706); and sending the message to a mobile device associated with the recipient with the one or more unique characters or pictures and the one or more additional details (step 708). The unique characters or pictures can include emojis, emoticons, buttons, or icons representing an associated functionality, application or service, such as characters defined in the Unicode standards. Note, one advantage of the unique characters or pictures is they do not take away from the message content, but rather augment it. That is, a clock can be used next to date and/or time, a location pin next to a place, a single silhouette next to a delegated task, a double silhouettes next to an invite to do something together, a check mark next to a checklist entry, etc.

The mobile device associated with the recipient is configured to receive the message and automatically perform one or more actions based on the one or more unique characters or pictures and the one or more additional details. The mobile device associated with the recipient is configured to receive the message from the mobile device associated with the sender; parse the message to detect the one or more unique characters or pictures; trigger a functionality, an application or a service subsequent to detection of the one or more unique characters, wherein the functionality, application or service are provided the one or more additional details; and perform one or more actions in the functionality, application or service with the one or more additional details. The functionality, application or service can include any of a reminder, a calendar, a mapping algorithm, a checklist, an address book, and any application offering Application Program Interfaces (APIs). The one or more unique characters or pictures can represent one or more of: a delegated task and the one or more additional details include the description of the delegated task, an invite to do something together and the one or more additional details include the description of the invite; a reminder or a calendar event and the one or more additional details include a date and/or time; a location and the one or more additional details include a geographic location, store, restaurant, or landmark; a checklist and the one or more additional details can include one or more entry for the checklist; and any item and the one or more additional details include the content passed to an API-ready application related to the item. Of course, the method 700 contemplates other applications or services, with associated characters and additional details.

The one or more unique characters or pictures can cause the mobile device associated with the recipient to one or more of: add a task responsive to the one or more unique characters or pictures representing the delegated task or the invite to do something together; add a reminder or calendar event for the task responsive to the one or more unique characters or pictures representing the reminder or calendar; add a geofence and/or a location in the task responsive to the one or more unique characters or pictures representing the location; add an entry in the checklist for the task responsive to the one or more unique characters or pictures representing the checklist; and perform an action responsive to one or more unique characters or pictures representing any API-ready application. Note, a geofence can cause a reminder or alert responsive to proximity to the location. The contextual messaging method 700 can further include receiving a response to the message from the recipient with different one or more additional details for the one or more unique characters or pictures; accepting or modifying the different one or more additional details; and updating the functionality, application or service with the different one or more additional details responsive to the accepting and sending modified one or more additional details responsive to the modifying.

Contextual Messaging Method—Recipient

Figure 8:
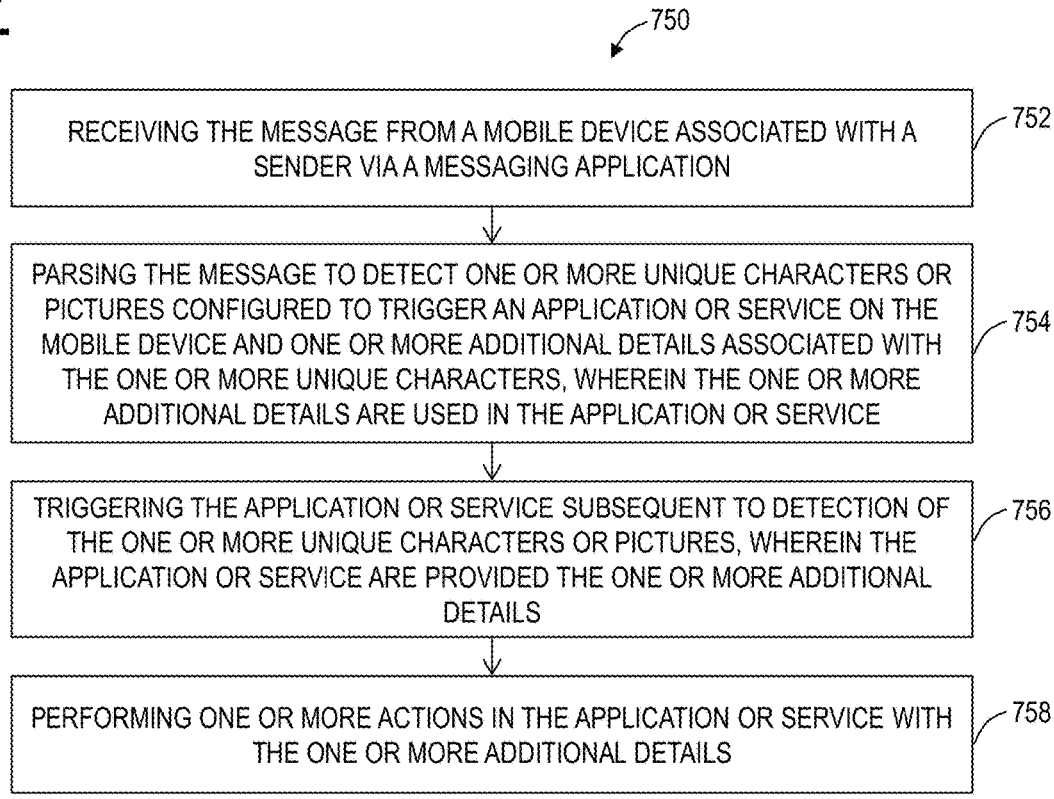
FIG. 8 is a flowchart of a contextual messaging method from a recipient's perspective.

Referring to FIG. 8, in an exemplary embodiment, a flowchart illustrates a contextual messaging method 750. The contextual messaging method 750 is implemented on the mobile device 120 associated with a recipient of a message. The contextual messaging method 750 includes receiving the message from a mobile device associated with a sender via a messaging application (step 752); parsing the message to detect one or more unique characters or pictures configured to trigger a functionality, an application or a service, on the mobile device and one or more additional details associated with the one or more unique characters, wherein the one or more additional details are used in the functionality, application or service (step 754); triggering the functionality, an application or a service subsequent to detection of the one or more unique characters or pictures, wherein the functionality, application or service are provided the one or more additional details (step 756); and performing one or more actions in the functionality, application or service with the one or more additional details (step 758). The unique characters or pictures can include emojis, emoticons, buttons, or icons representing an associated application or service. The mobile device associated with the sender can be configured to compose the message based on input from the sender through a messaging application.

The mobile device associated with the sender can be configured to compose the message based on the sender selecting the one or more unique characters or pictures to trigger a functionality, an application or service; and selecting the one or more additional details subsequent to selecting the one or more unique characters or pictures. The functionality, application or service can include any of a reminder, a calendar, a mapping algorithm, a checklist, an address book, and any application offering Application Program Interfaces (APIs). The one or more unique characters or pictures represent one or more of: a delegated task and the one or more additional details include the description of the delegated task, an invite to do something together and the one or more additional details include the description of the invite; a reminder or a calendar event and the one or more additional details include a date and/or time; a location and the one or more additional details include a geographic location, store, restaurant, or landmark; a checklist and the one or more additional details can include one or more entry for the checklist; and any item and the one or more additional details include the content passed to an API-ready application related to the item.

The one or more unique characters or pictures cause the mobile device associated with the recipient to one or more of: add a reminder or calendar event responsive to the one or more unique characters or pictures representing the reminder or calendar; add a geofence and/or a location in the reminder or calendar event responsive to the one or more unique characters or pictures representing the location; add one or more entries in the checklist responsive to the one or more unique characters or pictures representing the checklist; and process any item responsive to the one or more unique characters or pictures representing the API-ready application related to the item. The contextual messaging method 750 can further include composing a reply to the message with different one or more additional details for the one or more unique characters or pictures; sending the reply where the sender one accepts or modifies the different one or more additional details; and updating the functionality, application or service with the different one or more additional details responsive to acceptance by the sender and receiving modified one or more additional details responsive to the modification by the sender.

The contextual messaging methods 700, 750 can transform messages or the like into calendar events (including synchronization with third party calendars), reminders, to-dos delegated to or shared with other users, etc. using a combination of emojis, emoticons, buttons, or icons, natural language processing, and parsing to extract task name and type, time, location, checklist, etc. Note, the reminders or calendar events can also be delegated to or shared with other users, checking availability of the other users while typing the message. For example, as emojis, emoticons, buttons, or icons are selected for triggering functionality, the systems and methods can check availability based on other users' calendars, even if the users have a different calendar system (e.g., Outlook, iCloud, Google, etc.). Further, the systems and methods can include modifying and/or updating a calendar event from the recipient(s) side, even if the users have a different calendar system (e.g., Outlook, iCloud, Google, etc.).

The systems and methods can transform regular sentences (natural language) into functionality, such as by triggering applications or services, based on emojis, emoticons, buttons, or icons. Also, the systems and methods can create a summary of a conversation that includes time, location, a checklist, or any other relevant information extracted from the message exchange and updated by all participants of the conversation.

In an exemplary embodiment, the systems and methods can thread messages based on subject, such as a to-do, reminder, or calendar event description. To maintain the context of a conversation or thread across participating users, so when, for example, a to-do is marked complete by the recipient, the sender is notified or when time or location are mentioned, they are still associated to the same to-do, updating associated time or location.

Note, the contextual messaging methods 700, 750 describe techniques relative to messaging. Those of ordinary skill in the art will appreciate the same techniques could be used outside of messaging, such as through natural language and emojis for creating personal to-dos, reminders, calendar events, etc. Note, the convention solution for creating personal to-dos, reminders, events, etc. require to tediously fill various fields in a form, while here date, time, location, checklist, etc. are added through a combination of the emoji tagging, parsing and natural language processing, making the data entry as natural as writing it.

Additionally, the technique of triggering functionality based on emoji or the like can be extended to any third party API ready service. The various examples described herein, calendars, reminders, etc., are merely presented as exemplary embodiments for illustration purposes.

In an exemplary embodiment, to interact with a message or personal alert to take actions such as accept, change, complete, schedule, open maps, third party transportation apps, and the like. The systems and methods can use contextual information (e.g., current time, current user location, location entered in the task, etc.,) to get driving directions or cross launch third party apps (e.g. Uber), passing current user location as source and the location provided by the user in the task as destination.

The systems and methods can use contextual information (e.g., two or more people set up to meet at a certain time and location) to display respective location starting from a fixed time before the actual start of the meeting (e.g., 15 min before start); and use a combination of current time, traffic, time to destination to notify the other people about arrival time either automatically or after user approval acting on a notification.

To display a unified view of to-dos, reminders, calendar events, etc., the systems and methods treat all these events like tasks to be completed, manually or programmatically based on contextual information, and sorted by ascending start time. For reminders (a task with start time) and calendar events (a task with start and end time) start time is used in the sorting algorithm; for to-dos (a task with no start time) a dynamic start time is calculated by assigning each task a duration calculated based on user configurable end time of the day (e.g., default 7 PM), current time, busy time already assigned to calendar events and number of to-dos and reminders currently present in the today list of tasks; once the duration is calculated, each to-do has a dynamically assigned start time, which is (current time) for the first to-do, (current time+duration) for the second tasks, (current time+ 2× duration) for the third task and so on. If a calendar event or reminder is present, the start time for the following to-do is set to the end time of the calendar event or the start time+duration and the sequence is re-started. If start time of calendar event or reminder is less than current time, such task is listed as first item. Calendar events are autocompleted at end time; user is notified after one hour (configurable) if a reminder is not marked yet as done. Duration and start time of to-dos are constantly recalculated based on day context in order to dynamically create a schedule for the user to organize unscheduled to-dos in the free time between the scheduled reminders and calendar events.

Contextual Messaging Examples

Referring to FIGS. 9-15, in an exemplary embodiment, display screens 800, 802 illustrate an example contextual message on the mobile device 120 through the messaging application 512, utilizing the contextual messaging methods 700, 750. In an exemplary embodiment, the messaging application 512 includes an input section 810, including a keyboard 812, one or more unique characters or pictures 814, and an input line 816, and a message screen 820. The keyboard 812 is used to enter text, and the one or more unique characters or pictures 814 can be included in the text to trigger functionality, applications, or services, on the mobile device 120 and/or on the recipient's mobile device 120. The display screens 800, 802 include a full message conversation on the message screen 820.

Figure 9:
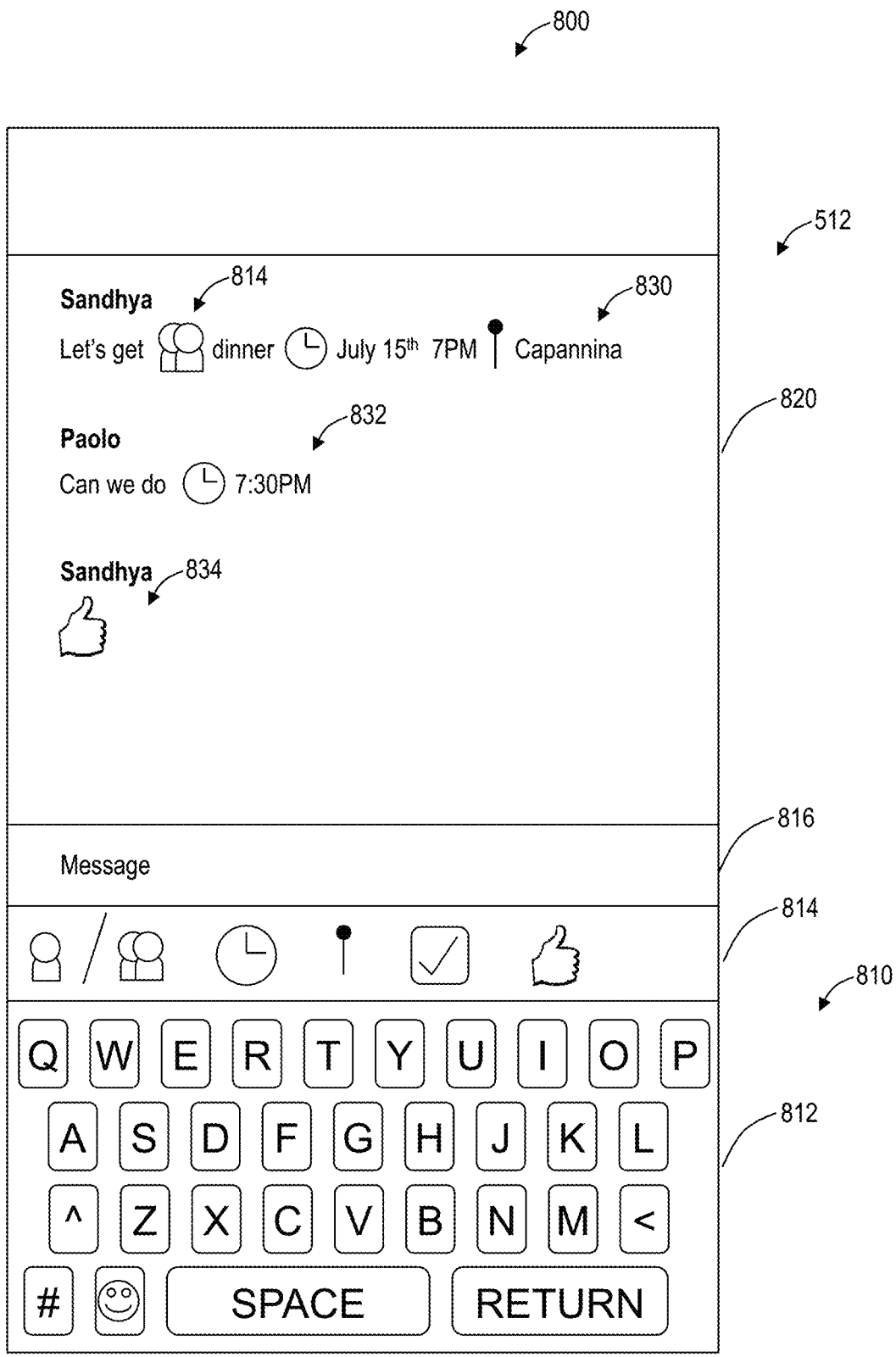
FIGS. 9-15 are display screens of an example contextual message on the mobile device through the messaging application, utilizing the contextual messaging methods of FIGS. 7 and 8.
Figure 11:
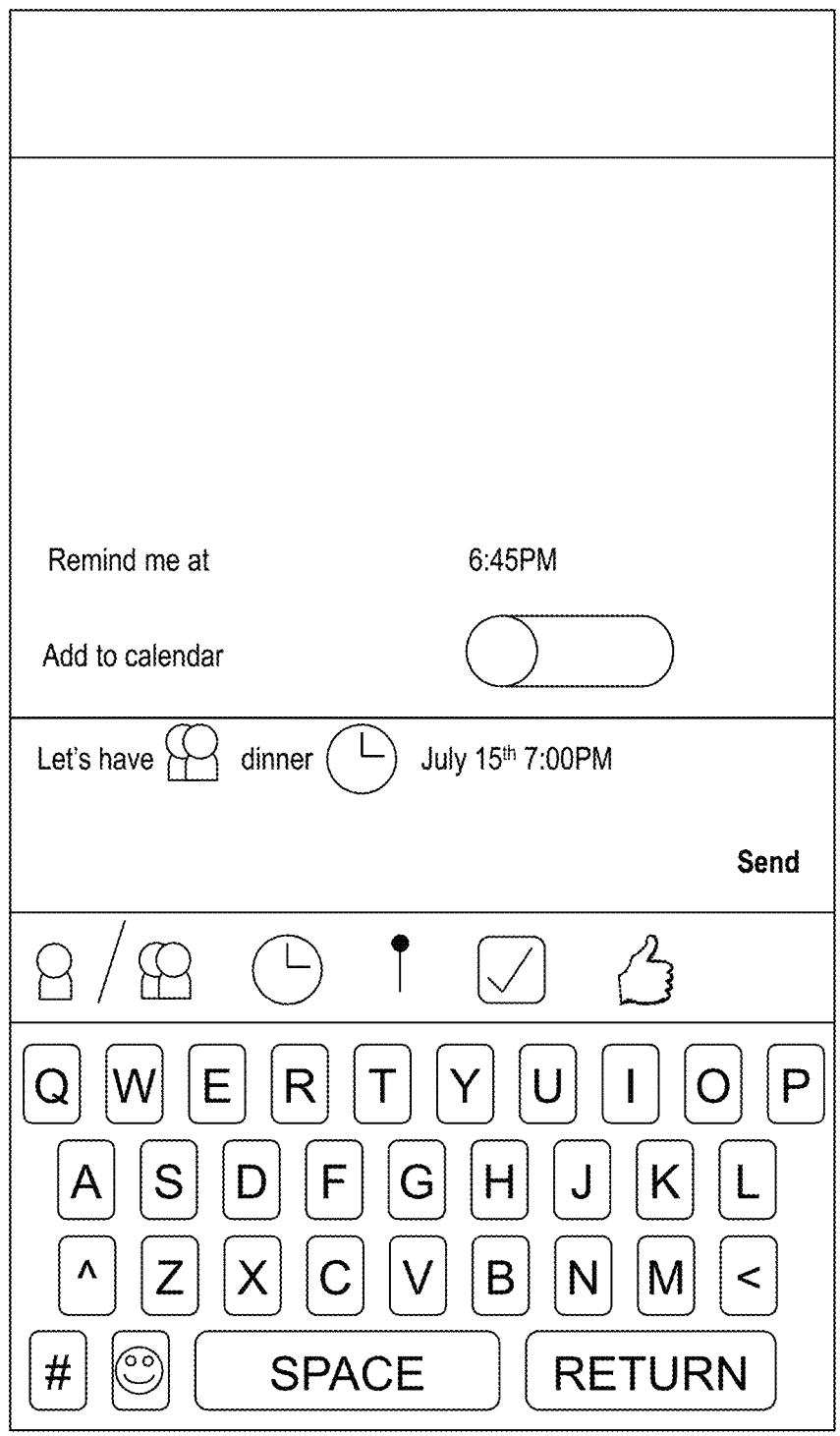
Figure 12:
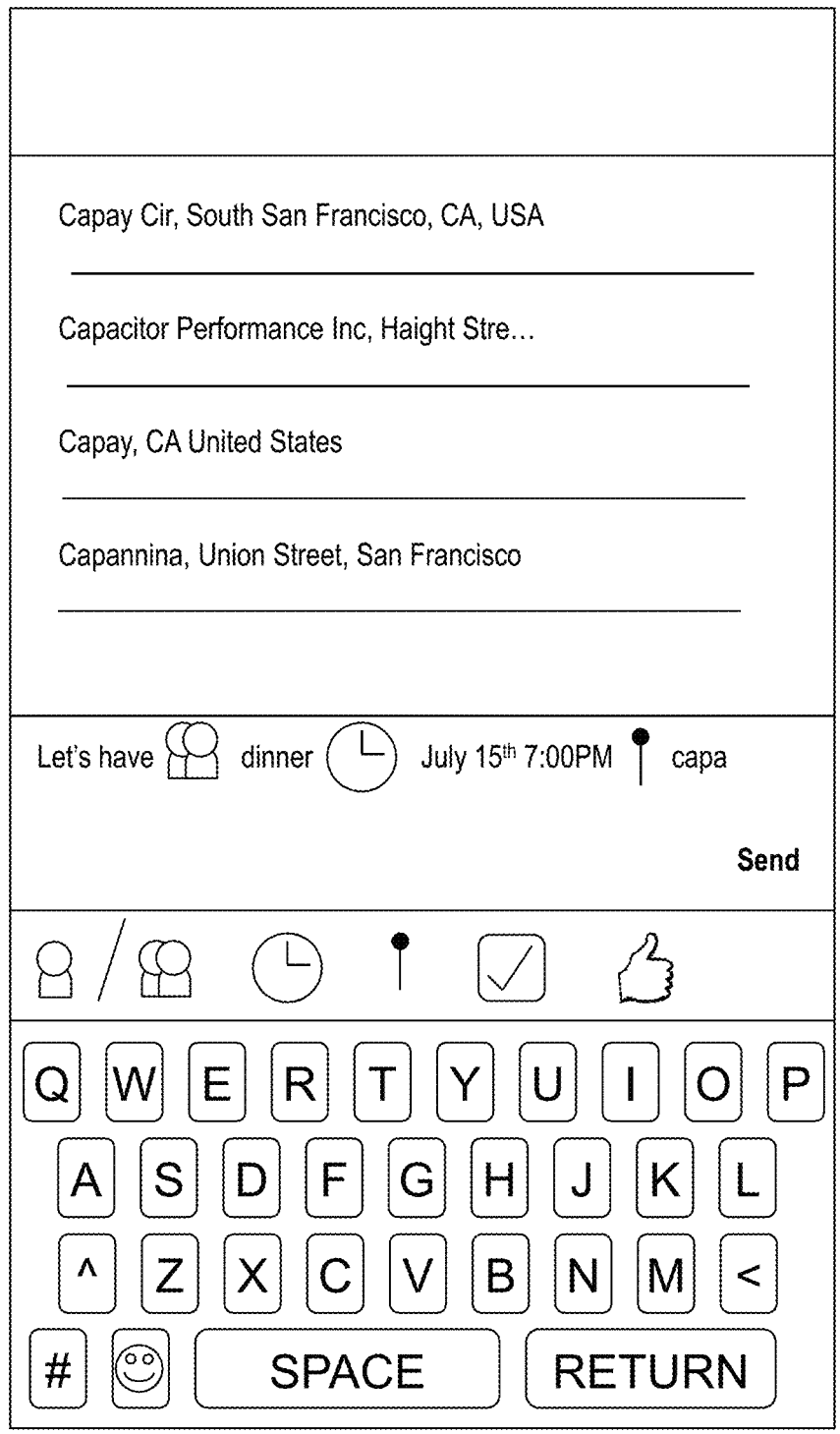
Figure 13:
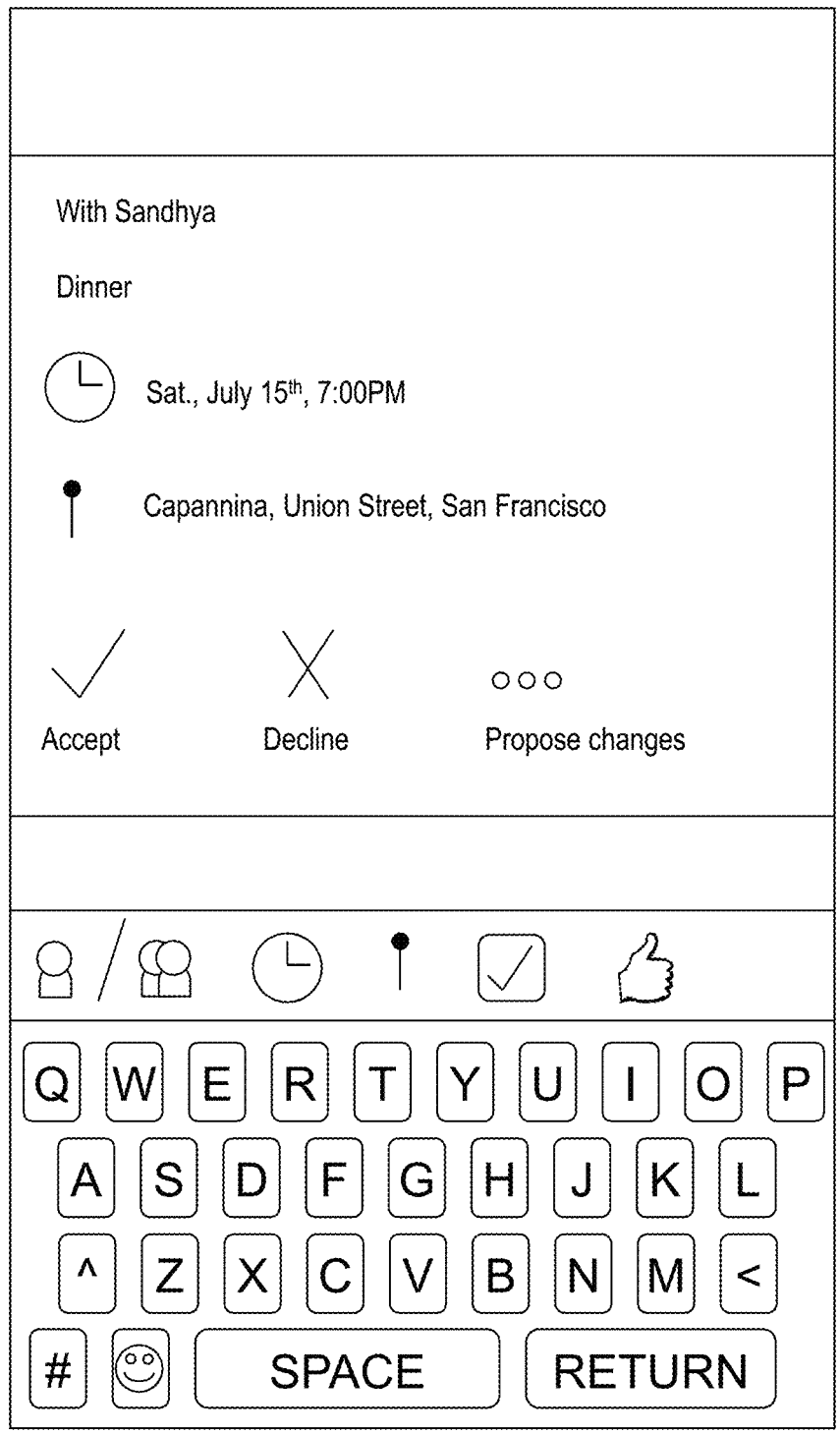
Figure 16:
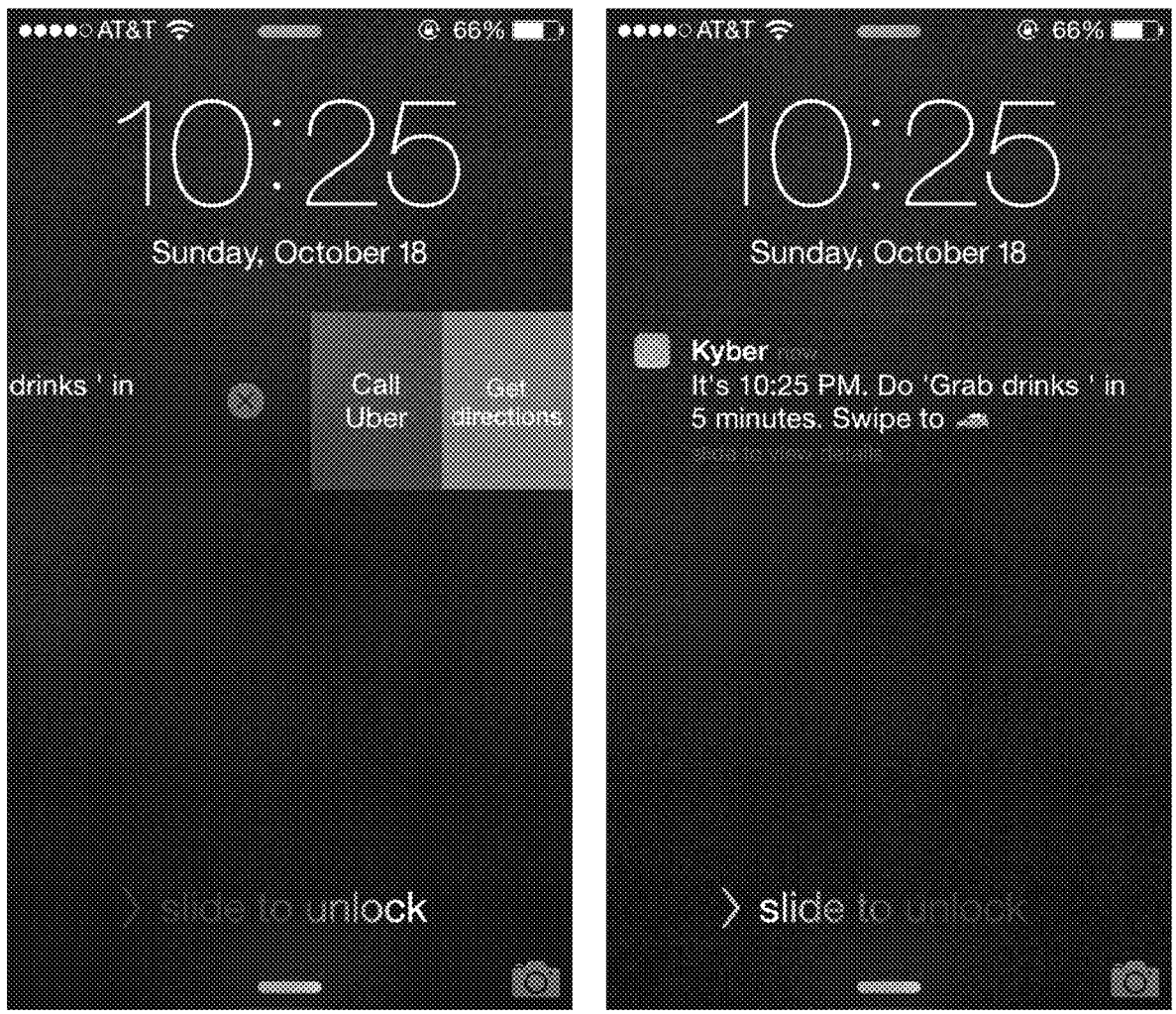
FIG. 16 are exemplary screen shots of reminders and prompts for third party services.

FIG. 9 illustrates a contextual message conversation related to a dinner appointment. Note, FIGS. 11-13 illustrate the various steps by the users, Sandhya, and Paolo, in creating the contextual message conversation. Here, Sandhya has asked Paolo to get dinner at July 15$^{th}$ at 7 PM at Capannina, which is a restaurant, at point 830. This includes unique characters or pictures 814 representing people (Sandhya and Paolo), date and time (July 15$^{th}$, 7 PM), and location (Capannina). At a point 832, Paolo replies with an alternate time, 7:30 PM, with the associated unique character or picture 814. Finally, at a point 834, Sandhya replies with acceptance denoted by the associated unique character or picture 814. Once Sandhya accepts, the mobile devices 120 for both users trigger applications or services to add calendar events with the people (Sandhya and Paolo), date and time (July 15$^{th}$, 7:30 PM), and location (Capannina). For example, upon acceptance, a shared card can be created between Sandhya and Paolo through the messaging application 512 along with synchronizing the event to their respective calendars. When the selected alert about the dinner is triggered or at a certain time before the start of the event (fixed or based on traffic conditions, location of the parties, etc.), the app will prompt the user to invoke third party transportation services (e.g., Uber) or get driving directions directly passing Capannina's address to those external services. For example, FIG. 16 illustrates exemplary screen shots of reminders and prompts for third party services.

Figure 10:
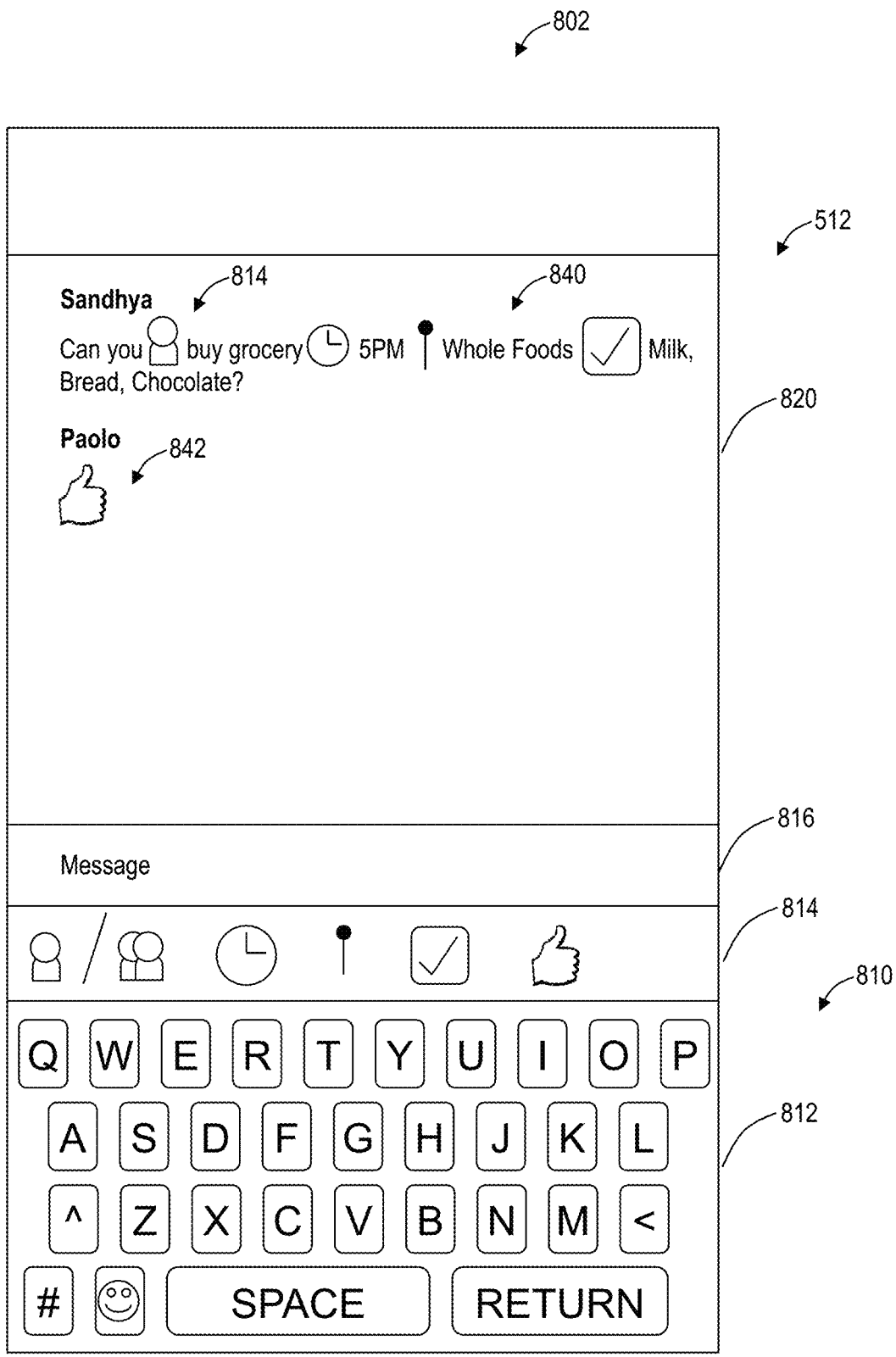
Figure 14:
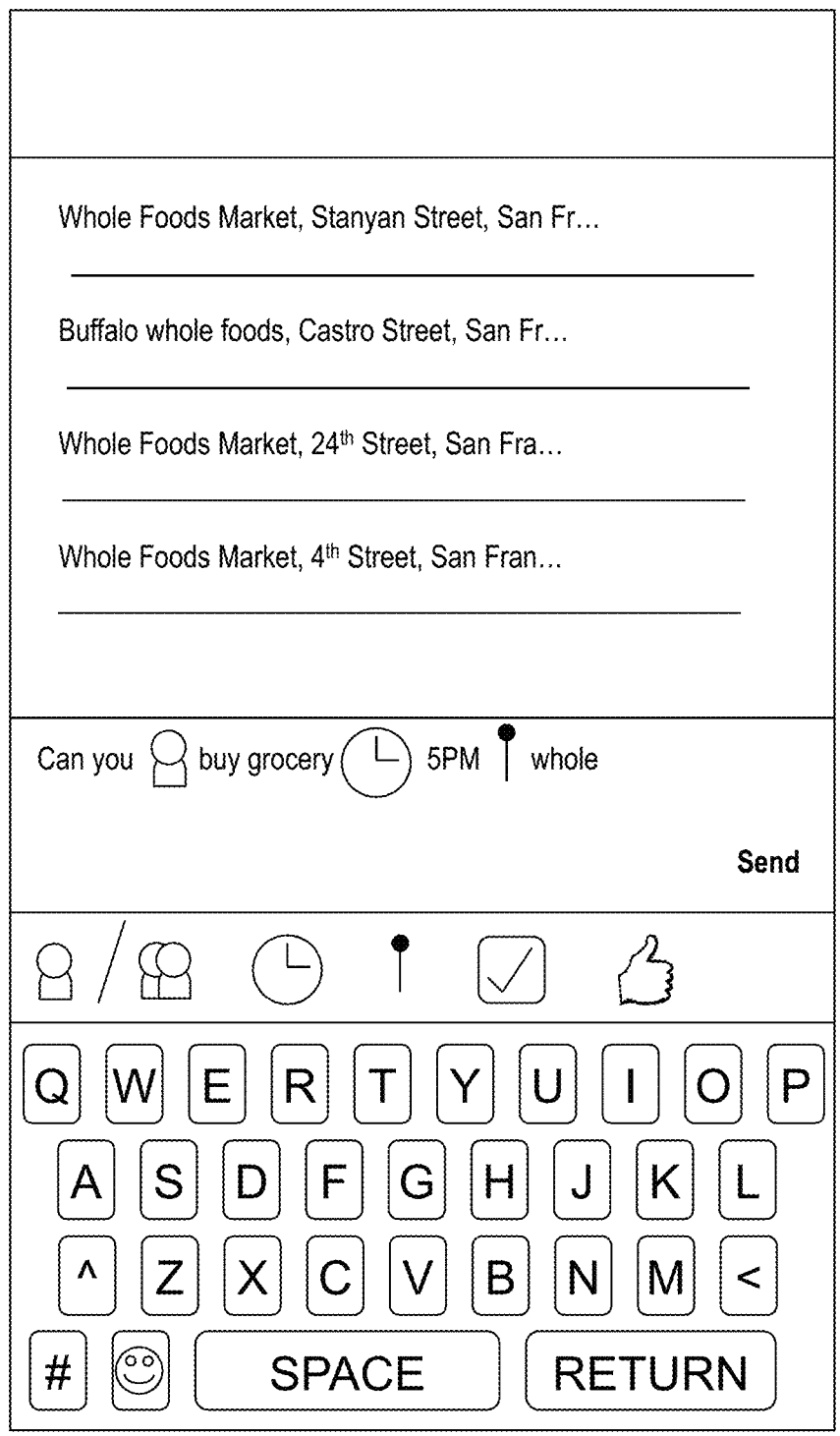
Figure 15:
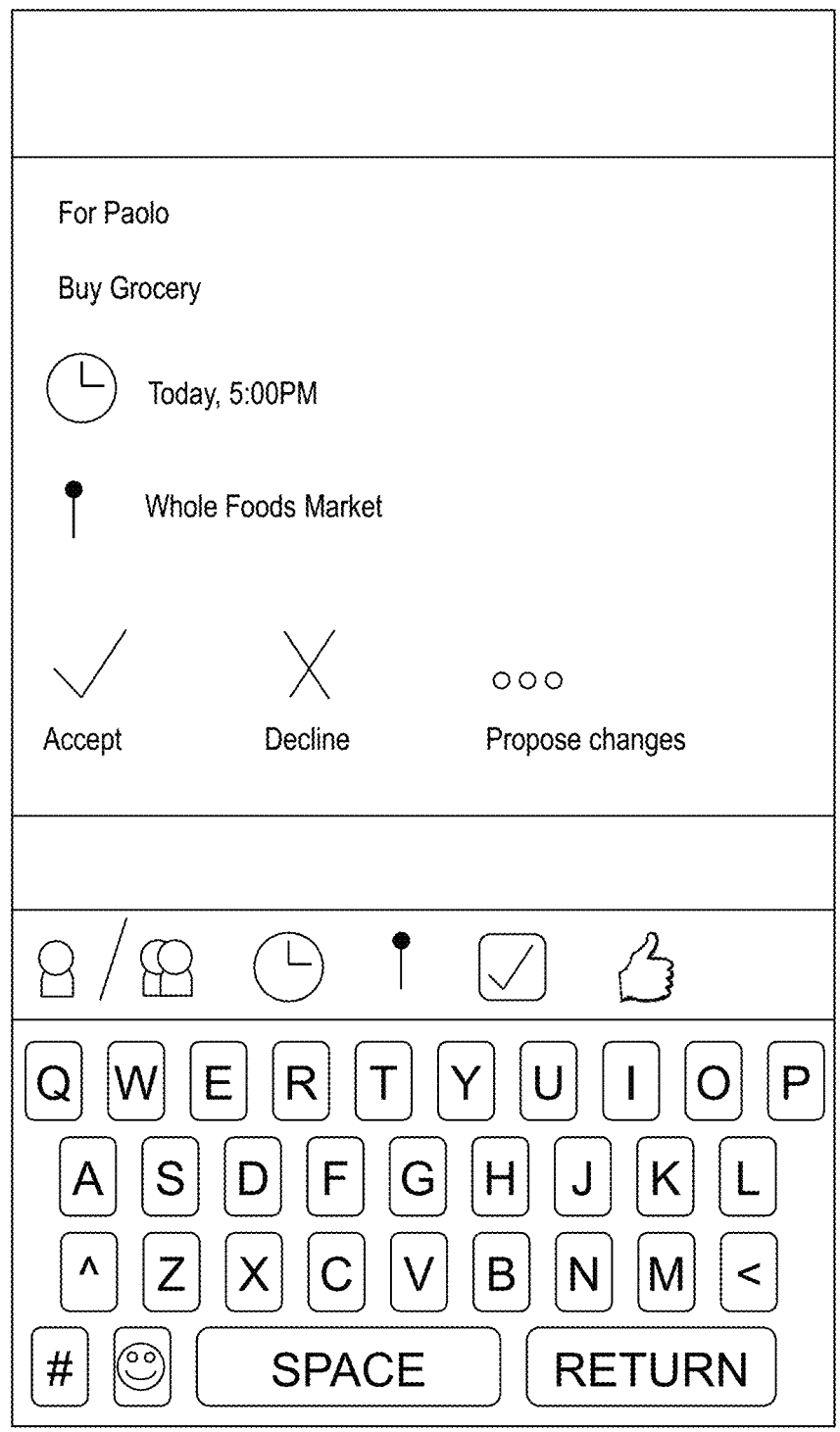

FIG. 10 illustrates a contextual message conversation related to picking up groceries. Note, FIGS. 14-15 illustrate the various steps by the users, Sandhya and Paolo, in creating the contextual message conversation. Here, Sandhya sends a message at point 840 asking Paolo (person) to buy groceries at 5 PM (date and time) at Whole Foods (location) and a list of the groceries to buy (reminder list). The message includes the associated unique character or picture 814 for the person, date and time, location, and reminder list. At a point 842, Paolo accepts the request, causing a new task card to be created along with reminders and notifications on Paolo's mobile device 120. Also, based on the location, geofencing can be utilized. Also, an alert is trigged on Paolo's device at 5 PM to remind him about Sandhya's request.

FIGS. 11-13 illustrate steps in creating the dinner appointment in FIG. 9. First, in FIG. 11, Sandhya composes a message, inserting the associated unique character or picture 814 for people to denote Sandhya and Paolo and the associated unique character or picture 814 for date and time to denote July 15$^{th}$ at 7:00 PM. Note, the date and time require additional options such as a reminder and whether or not to add to the calendar. In this step, the unique character or picture 814 is the people icon and the date and time icon and the one or more additional details are the people (Sandhya and Paolo) and the date and time (July 15$^{th}$, 7 PM) along with the options (reminder and add to calendar). FIG. 12 illustrates a continuation of the message by Sandhya where a location is selected. Here, the unique character or picture 814 is added for location and then the location is input. The messaging application 512 can provide a list as the location is typed, and Sandhya can choose one from the list, here Capannina. FIG. 13 illustrates Paolo's mobile device 120 after receiving the message from Sandhya. Here, Paolo can accept, decline, or propose changes. In this example, Paolo proposes a new time, 7:30 PM.

FIGS. 14-15 illustrate steps in creating the grocery list of FIG. 10. First, in FIG. 14, Sandhya composes a message, inserting the associated unique character or picture 814 for people to denote Paolo only and the associated unique character or picture 814 for date and time to denote today at 5:00 PM along with a location unique character or picture 814 and the location. The messaging application 512 can provide a list as the location is typed, and Sandhya can choose one from the list, here Whole Foods. Also, Sandhya can insert the unique character or picture 814 for a reminder list and add the specific groceries. Finally, FIG. 15 illustrates Paolo's mobile device 120 after receiving the message from Sandhya. Here, in this example, Paolo accepts the request.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A contextual messaging method implemented through a mobile device associated with a sender of a message, the contextual messaging method comprising:

composing a message to a recipient via a text messaging application;

selecting one or more unique characters or pictures which are included in the message for display in the message to the recipient and which are predetermined to trigger one or more functionality or service through an application of a plurality of applications separate from the text messaging application on a mobile device associated with the receipt, the one or more unique characters or pictures comprising emojis, emoticons, buttons, or icons representing an associated functionality, application or service;

selecting one or more additional details subsequent to selecting the one or more unique characters or pictures, wherein the one or more additional details are included in the message and used in the functionality, the application, and/or the service; and sending the message to a mobile device associated with the recipient with the one or more unique characters or pictures and the one or more additional details, wherein the mobile device associated with the recipient is configured to receive the message and automatically perform one or more actions that is triggered based on detection of the one or more unique characters or pictures for display in the message and that is performed at least in part by extracting the one or more additional details subsequent to the one or more unique characters or pictures from the message, wherein both the one or more unique characters or pictures and the one or more additional details are displayed in the message, wherein the text messaging application is configured to interact with the plurality of applications via Application Programming Interfaces (APIs) based on detection of the one or more unique characters or pictrures and the one or more additional details, and wherein the plurality of applications comprise a reminder application, a calendar application, a mappiing application, a checklist application, and an address book.

2. The contextual messaging method of claim 1, wherein the mobile device associated with the recipient is configured to receive the message from the mobile device associated with the sender; parse the message to detect the one or more unique characters or pictures; trigger the functionality, the application, or the service subsequent to detection of the one or more unique characters, wherein the functionality, application or service are provided the one or more additional details; and perform one or more actions in the functionality, application or service with the one or more additional details.

3. The contextual messaging method of claim 1, wherein the one or more unique characters or pictures represent one or more of:

a delegated task and the one or more additional details include the description of the delegated task;

an invite to do something together and the one or more additional details include a description of the invite;

a reminder or a calendar event and the one or more additional details comprise a date and/or time;

a location and the one or more additional details comprise a geographic location, store, restaurant, or landmark;

a checklist and the one or more additional details comprise one or more entry for the checklist; and any item and the one or more additional details include the content passed to an Application Program Interface (API)-ready application related to the item.

4. The contextual messaging method of claim 3, wherein the one or more unique characters or pictures cause the mobile device associated with the recipient to one or more of:

add a task responsive to the one or more unique characters or pictures representing the delegated task or the invite to do something together;

add a reminder or calendar event for the task responsive to the one or more unique characters or pictures representing the date/time;

add a geofence and/or a location in the task responsive to the one or more unique characters or pictures representing the location;

add an entry in the checklist for the task responsive to the one or more unique characters or pictures representing the checklist; and perform an action responsive to one or more unique characters or pictures representing any API-ready application.

5. The contextual messaging method of claim 1, further comprising:

receiving a response to the message from the recipient with different one or more additional details for the one or more unique characters or pictures;

accepting or modifying the different one or more additional details; and updating the functionality, application or service with the different one or more additional details responsive to the accepting and sending modified one or more additional details.

6. The contextual messaging method of claim 1, further comprising one or more of:

using information extracted from the messages to contextually send reminders and alerts to cross-launch applications and services comprising any of transportation services, driving directions, and interactions related to people mutual location;

creating personal to-dos, reminders, and calendar events that comprise a description, a time/date, a location, a checklist and notes based on the messages; and using a sorting algorithm to display to-dos, reminders, and calendars in a single view.

7. A contextual messaging method implemented through a mobile device associated with a recipient of a message, the contextual message comprising:

receiving the message from a mobile device associated with a sender via a text messaging application;

parsing the message to detect one or more unique characters or pictures which are included for display in the message and which are predetermined to trigger one or more functionality, application, or service on the mobile device and one or more additional details included in the message and associated with the one or more unique characters, wherein the one or more unique characters or pictures comprises emojis, emoticons, buttons, or icons representing an associated functionality, application or service, wherein the one or more additional details are used in the functionality or service through an application of a plurality of applications separate from the text messaging application, wherein both the one or more unique characters or pictures and the one or more additional details are displayed in the message with the one or more additional details displayed subsequent to the one or more unique characters;

automatically triggering the functionality, the application, and/or the service based on and subsequent to detection of the one or more unique characters or pictures, wherein the application is provided the one or more additional details extracted from the message by the text messaging application; and performing one or more actions in the application to perform the functionality and/or the service with the one or more additional details, wherein the text messagine application is configured to interact with the plurality of applications via Application Programming Interfaces (APIs) based on detection of the one or more unique characters or pictures and the one or more additional details, and wherein the plurality of applications comprise a reminder application, a calendar application, a mapping application, a checklist application, and an address book.

8. The contextual messaging method of claim 7, wherein the mobile device associated with the sender is configured to compose the message based on input from the sender through a text messaging application.

9. The contextual messaging method of claim 7, wherein the mobile device associated with the sender is configured to compose the message based on the sender selecting the one or more unique characters or pictures to trigger functionality, the application, and/or the service; and selecting the one or more additional details subsequent to selecting the one or more unique characters or pictures.

10. The contextual messaging method of claim 7, wherein the one or more unique characters or pictures represent one or more of:

a delegated task and the one or more additional details include the description of the delegated task;
an invite to do something together and the one or more additional details include the description of the invite;
a reminder or a calendar event and the one or more additional details comprise a date and/or time;
a location and the one or more additional details comprise a geographic location, store, restaurant, or landmark;
a checklist and the one or more additional details comprise one or more entries for the checklist; and
any item and the one or more additional details include the content passed to an Application Program Interface (API)-ready application related to the item.

11. The contextual messaging method of claim 7, further comprising:

composing a reply to the message with different one or more additional details for the one or more unique characters or pictures;
sending the reply where the sender one accepts or modifies the different one or more additional details; and
updating the functionality, application or service with the different one or more additional details responsive to acceptance by the sender and receiving modified one or more additional details.

12. A mobile device, comprising:

a network interface communicatively coupled to a network;
a location determination device configured to identify a location of the mobile device;
a processor communicatively coupled to the network interface and the location determination device; and
memory storing instructions that, when executed, cause the processor to:

execute a text messaging application;
detect one or more unique characters or pictures in a message through the text messaging application, the one or more unique characters or pictures comprisng emojis, emoticons, buttons, or icons representing an associated functionality, application or service;
execute one or more functionality or services through an application of a plurality of applications separate from the text messageing application automatically responsive to detection of the one or more unique characters or pictures in the message, wherein the text messaging application is configured to interact with the plurality of applicaitons via Application Programming Interfaces (APIs) based on the detection of the one or more unique characters or pictures;
extract one or more additional details included in the message from the message; and
provide the one or more additional details from the text messaging application to the application via a corresponding API, wherein the one or more additional details are associated with the one or more unique characters or pictures, wherein both the one or more unique characters or pictures and the one or more additional details are displayed in the message with the one or more additional details displayed subsequent to the one or more unique characters, wherein the plurality of applications comprise a reminder application, a calendar application, a mapping applicaton, a checklist application, and an address book.

13. The mobile device of claim 12, wherein the one or more unique characters or pictures represent one or more of:

a delegated task and the one or more additional details include the description of the delegated task;
an invite to do something together and the one or more additional details include a description of the invite;
a reminder or a calendar event and the one or more additional details comprise a date and/or time;
a location and the one or more additional details comprise a geographic location, store, restaurant, or landmark;
a checklist and the one or more additional details comprise one or more entries for the checklist; and
any item and the one or more additional details include the content passed to an Application Program Interface (API)-ready application related to the item.

* * * * *